(12) United States Patent
Takahashi et al.

(10) Patent No.: US 7,908,028 B2
(45) Date of Patent: Mar. 15, 2011

(54) MACHINING DEVICE AND METHOD

(75) Inventors: Masayuki Takahashi, Osaka (JP); Isao Tashiro, Osaka (JP); Toshihiko Wada, Osaka (JP)

(73) Assignee: Panasonic Corporation, Osaka (JP)

( * ) Notice: Subject to any disclaimer, the term of this patent is extended or adjusted under 35 U.S.C. 154(b) by 972 days.

(21) Appl. No.: 11/798,712

(22) Filed: May 16, 2007

(65) Prior Publication Data
US 2007/0276534 A1  Nov. 29, 2007

(30) Foreign Application Priority Data

May 19, 2006  (JP) ................................. 2006-139633

(51) Int. Cl.
*G06F 19/00* (2006.01)

(52) U.S. Cl. .................... 700/170; 700/173; 700/193

(58) Field of Classification Search .................. 700/170, 700/173, 193
See application file for complete search history.

(56) References Cited

U.S. PATENT DOCUMENTS

| 6,186,480 | B1 * | 2/2001 | Leteurtre ......................... 254/84 |
| 6,636,777 | B1 * | 10/2003 | Kokubo et al. ............... 700/193 |
| 6,812,664 | B2 * | 11/2004 | Fujinawa ...................... 318/560 |
| 6,985,792 | B2 * | 1/2006 | Tomelleri ...................... 700/176 |
| 7,203,569 | B2 * | 4/2007 | Liang et al. ................... 700/186 |
| 7,524,152 | B2 * | 4/2009 | Honegger et al. ............. 409/235 |
| 2004/0254673 | A1 * | 12/2004 | Tomelleri ...................... 700/176 |
| 2005/0137739 | A1 * | 6/2005 | Yoshida et al. ............... 700/170 |

* cited by examiner

*Primary Examiner* — Michael D Masinick
(74) *Attorney, Agent, or Firm* — Steptoe & Johnson LLP

(57) ABSTRACT

A triaxial tool unit includes three actuators 3, 4, 5 which operate in three-axis directions orthogonal to one another, a tool holder 7 provided at an intersection on axial lines in operating directions of the actuators 3, 4 and 5, and sensors 8, 9 and 10 which measure displacement amounts in the operating directions of the actuators 3, 4 and 5, and has a structure in which the sensors 8, 9 and 10 are disposed so that extension lines in respective sensing directions intersect with one another at one point.

8 Claims, 17 Drawing Sheets

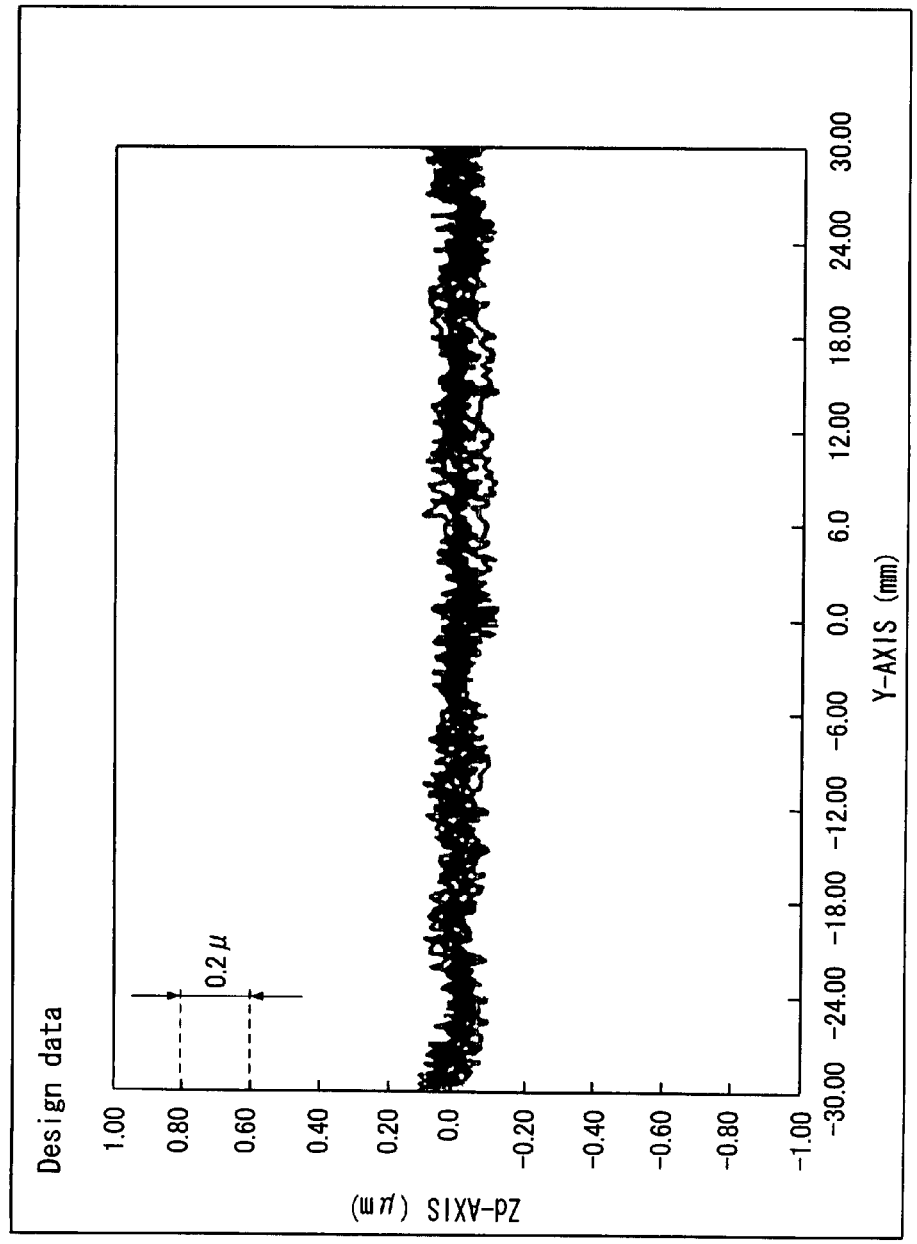

MACHINING DEVICE AND METHOD

The present application claims priority to Japanese Patent Application No. 2006-139633, filed May 19, 2006, which application is incorporated herein by reference in its entirety.

FIELD OF THE INVENTION

The present invention relates to a triaxial tool unit capable of minutely operating a tool in three-axial directions independently, a machining device loaded with the triaxial tool unit, and a machining method using the machining device.

BACKGROUND OF THE INVENTION

As a conventional high-speed positioning mechanism for a tool, there has been the one that directly moves a tool stand in one-axial direction by a piezoelectric element, a voice coil motor and an electromagnetic force ("Study on In-process Recognition of Machining Mode in Micro-cutting of Optical Glass", Japan Society of Precision Engineering Journal, Vol. 67, No. 5, 2001, p. 844 to 849). FIG. 17 shows an internal structural diagram of the conventional high-speed positioning mechanism.

As shown in FIG. 17, the conventional high-speed positioning mechanism has the structure in which a cylindrical piezoelectric element 101 is fitted in a casing 100, and a tool holder 102 which is a movable part is supported by a diaphragm 103 so that the displacement of the tool holder 102 is directly measured by a capacity type displacement sensor 104. The tool holder 102, the capacity type displacement sensor 104 and a diamond tool 105 are disposed so that center lines of them are aligned with each other.

FIG. 18 shows a block diagram of a position control loop circuit that performs positioning control of the tool in the above described conventional high-speed positioning mechanism. The conventional high-speed positioning mechanism feeds back a signal indicating a displacement amount of the tool holder 102 by the capacity type displacement sensor 104, phase-compensates a deviation of the fed-back signal and a command value by a compensation circuit including an integrator 110 and a notch filter 111, performs power amplification of the phase-compensated signal by an amplifier (included in a block 112) to perform positional control of the cylindrical piezoelectric element 101.

In recent years, with the developments in an optical design technique and machining technique, a nonaxisymmetric aspheric surface (commonly called "free curved surface" sometimes since the nonaxisymmetric aspheric surface is not rotationally symmetric and has no symmetrical surface in any quadrant) has been achieved.

For machining to make a surface to be machined a nonaxisymmetric aspheric surface, a machining method called a raster fly cut method is used. FIG. 19 shows a schematic view of the raster fly cut method. In this machining method, a workpiece 202 is slowly machined for each line as raster scanning based on NC data by a tool 201 attached to a shaft 200 rotating at a high speed. When machining for one line is finished, the tool 201 is returned to the original position, and by shifting the pitch by a predetermined distance, the next line is machined. In short, the surface to be machined is finished by one-way machining. This is because reciprocating machining makes the machined surface on which up-cut surfaces and down-cut surfaces are alternately repeated, and the state of the machined surface is not constant. Therefore, reciprocating machining is not used for finish machining, though it is sometimes used in rough machining. In addition, reciprocating machining is not desirable in terms of the wear of tools. For the above reasons, one-way machining is generally used in the raster fly cut method.

This raster fly cut method has relatively less restriction, and this method can be realized by only attaching a tool via a holder to the shaft rotating at a high speed on an ultra-precision processing machine which triaxially operates. However, the largest disadvantage of this machining method is that it requires a long machining time. In the case of finishing a nonaxisymmetric aspheric surface of, for example, approximately 200 mm×10 mm, the machining time of substantially 20 hours is required. When the machining takes such a long time, machining accuracy is reduced. In other words, the machining environment (temperature, atmospheric pressure, humidity, disturbance such as vibration, and the like) is highly likely to change during machining, and the change in the machining environment is the factor of preventing the accuracy from being improved. Tremendous cost is required to reduce the factor of these environmental changes with relatively small effects. In addition, in this machining method, the time and the volume of the data required for creating the NC data are tremendous.

Thus, it is conceivable that the above described high-speed positioning mechanism of one uniaxial constitution is also used even in machining for making the surface to be machined a nonaxisymmetric aspheric surface. In the case of using this mechanism, the workpiece is rotated as if the workpiece were machined with a lathe, and the tool is moved in the radius direction of rotation of the workpiece while the tool is being controlled at a high speed. If this machining can be realized, there arises the possibility of making the machining time equal to the time required for machining to make the surface to be machined a rotational symmetrical surface. That is, the machining time can be shortened to approximately 1/10 to 1/100 as compared with the machining time by the conventional raster fly cut method.

However, the above described high-speed positioning mechanism of the uniaxial constitution has the disadvantage that rigidity in the direction orthogonal to the operating direction of the movable shaft is low. In the constitution example shown in FIG. 17, the portion in the direction orthogonal to the operating direction of the movable shaft is supported by only the diaphragm 103. Even if the tool is held by such a supporting method, a favorable machined surface is not achieved since the rigidity in the direction orthogonal to the operating direction of the movable shaft is low and the tool needlessly moves due to the machining resistance.

In addition, when machining is performed by using the above described high-speed positioning mechanism of the uniaxial constitution, the cutting edge of the tool is limited in size, and therefore, it is necessary to in advance calculate with which portion of the cutting edge the work piece is machined, and control the position of the tool. This problem is explained with reference to FIG. 20.

FIG. 20 shows an explanatory diagram for explaining the machining operation of the conventional high-speed positioning mechanism of the uniaxial constitution. Herein, in order to facilitate understanding of the above described problem of the high-speed positioning mechanism of the uniaxial constitution, an explanation will be made by illustrating machining for creating the rotational symmetrical surface defined by the function z=f(x) as an example.

The high-speed positioning mechanism of the uniaxial constitution operates a tool 300 in only a Z-axis direction. The tool 300 has a cutting edge of a constant radius r. The workpiece is rotated around the Z axis. In this example, machining to be performed on an axially symmetric surface is adopted, and therefore, the high-speed positioning mechanism of the uniaxial constitution is moved toward the rotational center from the outer peripheral side of the rotating workpiece.

When an arbitrary point (control point) P on the curved surface defined by the function z=f(x) is finished as shown in FIG. 20, the high-speed positioning mechanism of the uniaxial constitution drives the tool 300 so that a tip end portion of the cutting edge of the tool 300 coincides with the control point P, but at this time, a portion different from the tip end portion of the cutting edge contacts the already machined portion of the workpiece, and an interference point (actual machining point) M which the cutting edge interferes with and the control point P do not coincide with each other. As a result, the workpiece is excessively cut from the curved surface defined by the function z=f(x), and a favorable machined surface is not achieved.

In order to avoid the problem of excessive cutting, it is preferable if the interference point can be calculated in real time during machining, but in view of the actual machining speed, and calculation ability of a computer, it is difficult with the current technology. Therefore, it is necessary to calculate in advance the position where the tool should trace, before starting the machining operation, and to perform machining based on the NC data. When the rotational symmetrical surface as shown in FIG. 20 is produced, the calculation amount is small, and much time and effort are not required. However, when a nonaxisymmetric aspheric surface which does not have a symmetrical shape is produced, the number of calculation points of the NC data reaches 1 million even when the nonaxisymmetric aspheric surface is a small surface 10 mm square, for example. Since convergent calculation accompanies calculation of the NC data though not described in detail, calculation time is tremendous with a large amount of calculation (Japanese Patent Laid-Open No. 2001-282332). It is not uncommon occurrence that the capacity of the produced NC data exceeds 100 megabytes. In actual machining, when the tool is replaced with the one having a different radius of the cutting edge, the NC data needs to be produced at each replacement.

In short, even if machining of producing a nonaxisymmetric aspheric surface can be realized by the conventional high-speed positioning mechanism of the uniaxial constitution, an immense amount of time is required for creation of the NC data though the machining time is shortened, and this is not practical with all the factors considered. Therefore, such a method has not been practically used conventionally.

DISCLOSURE OF THE INVENTION

An object of the present invention is to provide a triaxial tool unit enabling machining at a high speed with high accuracy, a machining device loaded with the triaxial tool unit, and a machining method using the machining device.

In order to attain the above-described object, the triaxial tool unit according to the present invention includes a tool, a tool holder to which the aforesaid tool is fixed, three actuators which operate in three-axis directions orthogonal to one another to displace a position of the aforesaid tool holder, and three sensors which generate signals indicating displacement amounts in operating directions of the aforesaid respective actuators, wherein the aforesaid tool holder is provided at an intersection on axial lines in the operating directions of the aforesaid respective actuators, and the aforesaid three sensors are disposed so that extension lines in respective sensing directions intersect with one another at one point.

In the above described triaxial tool unit, the triaxial tool unit according to the present invention includes the aforesaid respective sensors are disposed at positions different from positions on the axial lines in the operating directions of the aforesaid respective actuators.

In the above described triaxial tool unit, the triaxial tool unit according to the present invention includes a cutting edge of the aforesaid tool located on an extension line in the sensing direction of at least one sensor of the aforesaid three sensors.

In the above described triaxial tool unit, the triaxial tool unit according to the present invention includes the cutting edge of the aforesaid tool is located on an intersection on the extension lines in the sensing directions of the aforesaid three sensors.

In the above described triaxial tool unit, the triaxial tool unit according to the present invention includes at least one of the aforesaid three actuators including a piezoelectric element.

A machining device according to the present invention includes the above described triaxial tool unit, a linear stage which moves the aforesaid triaxial tool unit relatively to a workpiece in three-axis directions orthogonal to one another, a rotary stage which causes the triaxial tool unit to make circular motions relatively to the aforesaid workpiece, a reference calculation processing section which obtains references of the respective displacement amounts of three actuators included in the aforesaid triaxial tool unit according to three-axial coordinates of the aforesaid linear stage and an angular coordinate of the aforesaid rotary stage, and generates command signals to the aforesaid respective actuators, a machining condition input section for inputting a machining shape, machining conditions and information corresponding to a constitution of the aforesaid triaxial tool unit, and three positional control loop circuits which generate signals for controlling operations of the aforesaid respective actuators based on deviations between signals from three sensors included in the aforesaid triaxial tool unit and the aforesaid respective command signals, wherein a cutting edge of a tool included in the aforesaid triaxial tool unit is brought into contact with the aforesaid workpiece to machine the workpiece by adjusting a relative position of the aforesaid triaxial tool unit to the aforesaid workpiece by the aforesaid linear stage, and by driving the aforesaid respective actuators by the aforesaid respective positional control loop circuits, while causing the aforesaid triaxial tool unit to perform circular motion relatively to the aforesaid workpiece by the aforesaid rotary stage.

In the above described machining device, the machining device according to the present invention includes the aforesaid reference calculating unit including a machining frequency calculation part which calculates operation frequencies of the aforesaid respective actuators in a machining range corresponding to the present three-axis coordinates of the aforesaid linear stage, a phase delay calculation part which calculates phase delays of the signals for controlling the operations of the aforesaid respective actuators with respect to the aforesaid respective command signals, based on the operation frequencies calculated by the aforesaid machining frequency calculation part and frequency characteristics of the aforesaid respective positional control loop circuits, a rotational delay angle calculation part which calculates a rotational delay angle that is a rotational angle of the aforesaid rotary stage of an operation delay amount with respect to each of the aforesaid command signals of each of the aforesaid actuators, based on the respective phase delays and a rotational speed of the rotary stage, and a reference calculation part which starts calculation of the aforesaid respective references in advance by the aforesaid respective rotational delay angles from the angular coordinate of the aforesaid rotary stage at a time of the cutting edge of the aforesaid tool entering the aforesaid machining range.

The machining device according to the present invention is the above described machining device, and further includes a rotational angle calculating part which obtains a force by elastic strains of three axes of the triaxial tool unit based on the aforesaid respective references, and calculates a rotational angle around three axes of a tool holder included in the aforesaid triaxial tool unit based on the obtained force by the elastic strains, and a positioning error calculating part which calculates a positioning error of the cutting edge of the aforesaid tool based on a distance between an intersection on extension lines in sensing directions of the aforesaid three sensors and the cutting edge of the aforesaid tool and the aforesaid rotational angle around the three axes, wherein the aforesaid reference calculation processing section further has a function of correcting the aforesaid respective references based on the aforesaid positioning error.

A machining method according to the present invention is the machining method using the above described machining device, and comprises the step of inputting a design formula defining a machining target and a shape of a tool by a machining condition input part included in the aforesaid machining device, wherein the aforesaid machining device performs machining in sequence while calculating a machining point in real time and obtaining references of actuators included in the aforesaid machining device during machining.

According to the present invention, the reference after correction of an error that occurs because a movement of the tool cannot follow the command sufficiently, and an error caused by the tool cutting edge having a limited size can be calculated in real time. Further, the reference after correction of a positional error of the tool cutting edge due to the constitution and operation of the triaxial tool unit can be calculated in real time. Therefore, high-speed ultra precision machining can be performed by operating the tool three-dimensionally with high accuracy, and the asymmetric components and the like of which machining takes a long time conventionally can be produced at a high speed with high accuracy. As a result, the machining time is shortened, and therefore, machining accuracy is enhanced.

Further, according to the present invention, the machining points can be calculated in sequence in real time, and therefore, the NC data does not need to be produced in advance. Since calculation of the cutting edge position is executed equidistantly, and machining is performed in sequence, machining striations (tool trajectory spaces) by cutting remain equidistantly, and machined surface roughness is improved. Rigidity with which the tool is held is enhanced, and therefore, machining accuracy is improved.

Accordingly, the present invention is useful in producing precision components having microscopic shapes such as an optical component in a nonaxisymmetric aspheric surface shape, and a precision mechanism component.

DESCRIPTION OF THE EMBODIMENT(S)

Embodiment 1

Figure 1:
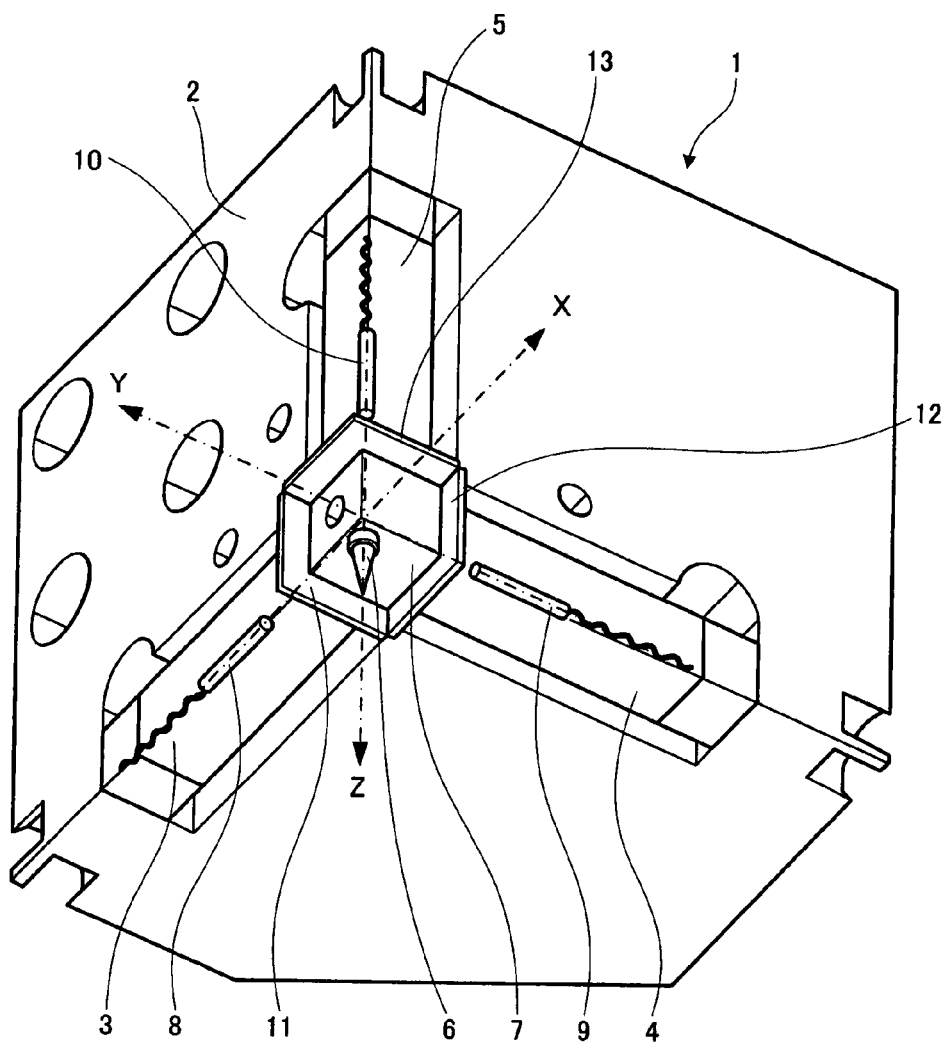
FIG. 1 is a schematic view of a triaxial tool unit in embodiments 1 and 2 of the present invention.

A triaxial tool unit, a machining device loaded with the triaxial tool unit, and a machining method using the machining device in an embodiment 1 of the present invention will now be described with reference to the drawings. FIG. 1 is a schematic view of the triaxial tool unit in the embodiment 1 of the present invention.

In a triaxial tool unit 1 shown in FIG. 1, one end of each of three actuators 3, 4 and 5 is fixed to a supporter 2 via mounting members. The actuators 3, 4 and 5 constituting three axes (X, Y and Z axes) orthogonal to one another of the triaxial tool unit 1 operate in the directions of the X, Y and Z axes respectively to displace the position of the tool holder 7.

The three-axial actuators 3, 4 and 5 as shown in FIG. 1 make a highly rigid actuator structure. That is, even when an external force is exerted onto the tool holder 7 provided at the tip end portions of the actuators 3, 4 and 5 from any direction, the three-axial actuators 3, 4 and 5 assist one another to suppress change of the axes by the external force.

In the embodiment 1, the actuators are comprised of piezoelectric elements. As the piezoelectric elements, those of a stacked type with PZT ($PbZrO_3$—$PbTiO_3$) as a main component, or the like can be used, for example. When precision machining is performed, extension and contraction of the composing member of the triaxial tool unit by change in ambient temperature affect machining accuracy, and therefore, the supporter 2 is desired to be constituted of a low thermal expansion material. As the low thermal expansion material, invar is desirable. For example, Super Inver: 63Fe-32Ni-5Co), SUPER LEX5 made by Nippon Chuzo Co., Ltd. and the like are desirable because the thermal expansion coefficients at a room temperature are close to zero.

The tool holder 7 to which a tool 6 is fixed is attached to the other ends different from the ends at which the actuators 3, 4 and 5 are fixed to the supporter 2, and is provided at an intersection on the axes in the operating directions of the actuators 3, 4 and 5. This tool holder 7 is also desirable to be comprised of a low thermal expansion material in order to enhance machining accuracy. As the low thermal expansion material, invar is desirable. For example, Super Inver: 63Fe-32Ni-5Co, SUPER LEX5 made by Nippon Chuzo Co., Ltd. and the like are desirable because the thermal expansion coefficients at a room temperature are close to zero.

Sensors 8, 9 and 10 are also attached to the supporter 2 via sensor holders not shown. The sensor holders are also desirably comprised of a low thermal expansion material in order to avoid an error operation by thermal deformation. As the low expansion material, invar is desirable. For example, Super Inver: 63Fe-32Ni-5Co, SUPER LEX5 made by Nippon Chuzo Co., Ltd. and the like are desirable because the thermal expansion coefficients at a room temperature are close to zero.

In the embodiment 1, sensor targets 11, 12 and 13 which are the measurement targets of the sensors 8, 9 and 10 are provided so as to be integrated with the tool holder 7. The sensor targets may be provided separately from the tool holder if the sensor targets are displaced in accordance with displacement of the tool holder.

The sensors 8, 9 and 10 fixed to the supporter 2 via the sensor holders sense the distances from the tip end portions of the sensors 8, 9 and 10 to the sensor targets 11, 12 and 13 which displace in accordance with displacement of the tool holder 7, and generate displacement signals indicating actual displacement amounts (positional information of the actuators) in the X, Y and Z axes directions (operating directions) of the actuators 3, 4 and 5.

As the sensors 8, 9 and 10, well-known capacitance type sensors, eddy current type sensors, optical sensors and the like can be used. In order to operate the actuators with higher accuracy, the sensors are desirably comprised of capacitance type sensors.

Figure 2:
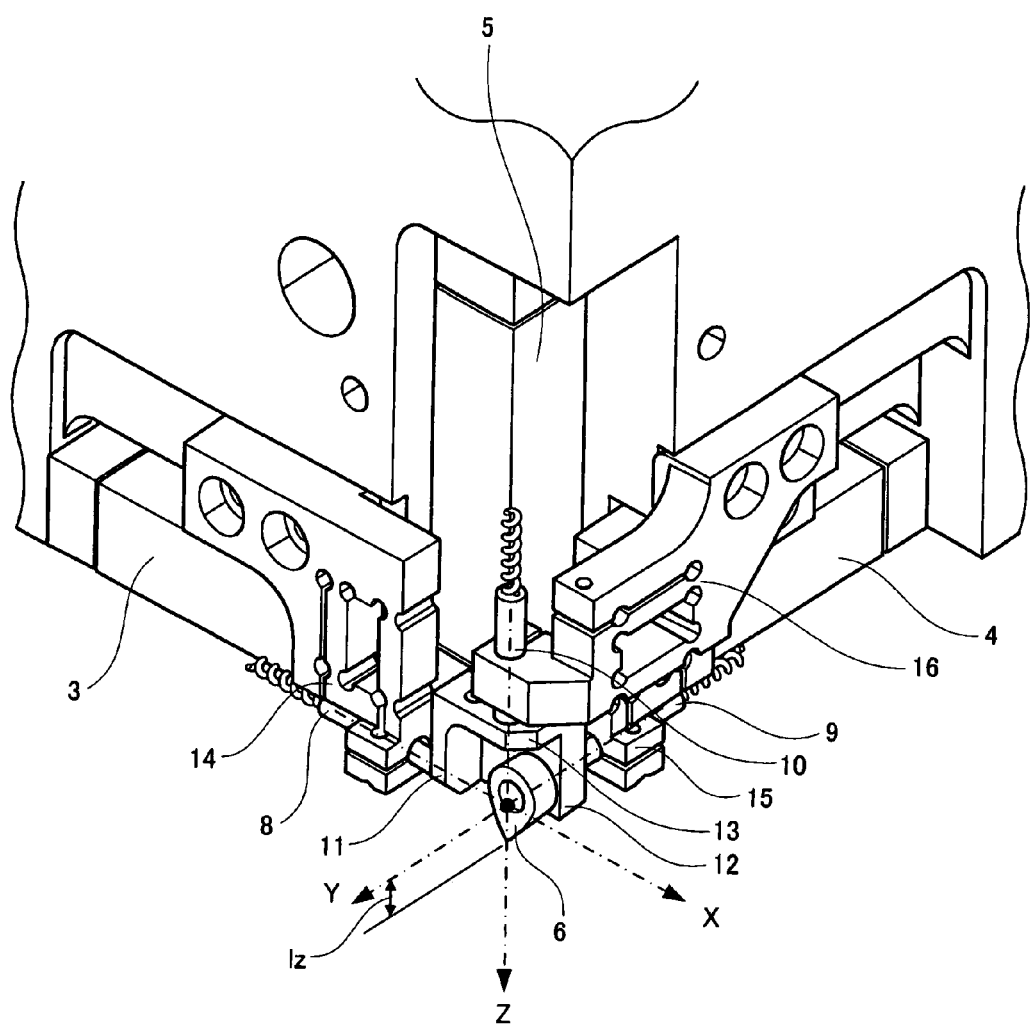
FIG. 2 is a schematic view showing sensor disposition of the triaxial tool unit in the embodiments 1 and 2 of the present invention.

FIG. 2 shows disposition of the sensors 8, 9 and 10. As shown in FIG. 2, the sensors 8, 9 and 10 are attached to the supporter 2 via sensor holders 14, 15 and 16, and are disposed so that respective extension lines in the sensing directions interest with one another at one point. The sensor holders 14, 15 and 16 adopt jogging mechanisms using elastic deformation in view of easiness of adjustment at the time of attaching the sensors. For example, the sensor holders 14, 15 and 16 are configured to be elastically deformed in the sensing directions of the sensors 8, 9 and 10 by adjustment screws. As a configuration in which the sensor holders elastically are deformed by an adjustment screw, for example, the constitution of an elastic hinge can be used. By the sensor holders 14, 15 and 16, the spaces between the tip end portions of the sensors 8, 9 and 10 and the sensor targets 11, 12 and 13 are adjusted to be predetermined spaces at the time of attaching the sensors.

When piezoelectric elements are used for the actuators 3, 4 and 5, the actuators 3, 4 and 5 are operated in the X, Y and Z axes directions by applying voltages to the piezoelectric elements, and extending and contracting the piezoelectric elements. However, the piezoelectric elements are the elements having hysteresis, and therefore, by only applying voltages, corresponding to the references of the displacement amounts in the X, Y and Z axes directions of the actuators 3, 4 and 5, to the piezoelectric elements the actuators 3, 4 and 5 cannot be driven with high accuracy. Thus, by performing feedback control to keep the regular spaces between the sensors 8, 9 and 10 and the sensor targets 11, 12 and 13 based on the displacement signals generated by the sensors 8, 9 and 10, the characteristics without hysteresis is generally realized.

Figure 3:
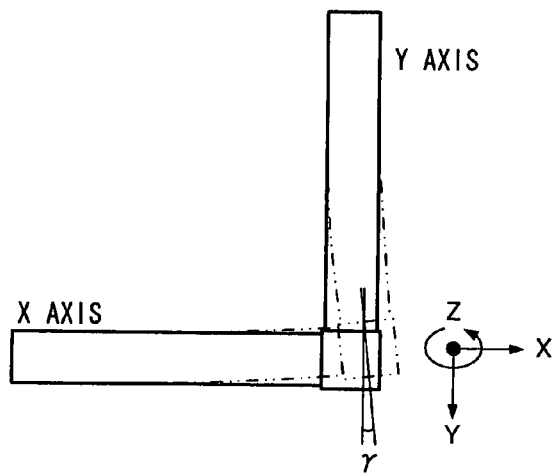
FIG. 3 is a schematic diagram for explaining rotational movement around three axes of a tool included in the triaxial tool unit in the embodiments 1 and 2 of the present invention.

When the three-axis actuators 3, 4 and 5 are operated, the tool holder 7 is pushed and pulled from the respective axes, and elastic strain (elastic deformation) occurs to the three axes, and the tool holder 7 (tool 6) rotationally moves around the three axes due to the force by the elastic strain of the three axes. The rotational movement will be described with reference to FIG. 3. FIG. 3 is a schematic diagram for explaining rotational movements of the tool holder. For example, as shown in FIG. 3, the Y axis deflects around the Z axis by pressing the tool holder from the X axis, and by deflection (elastic strain) of the Y axis, the tool holder rotates around the Z axis at a rotational angle $\gamma$.

The tool holder 7 rotationally moves around the X, Y and Z axes (around three axes) by operations in the X, Y and Z axes directions of the actuators 3, 4 and 5 in this manner, and therefore, a positioning error occurs to the cutting edge of the tool 6. When the sensors 8, 9 and 10 are disposed so that the extension lines in the respective sensing directions do not intersect with one another at one point, the rotational movements around the three axes of the tool holder 7 are performed with different rotational centers as the centers respectively. Therefore, in this case, the movement of the tool holder 7 is complicated, and the time taken to calculate for correcting the positioning error of the cutting edge of the tool 6 becomes long.

Thus, in the triaxial tool unit in the embodiment 1, the sensors 8, 9 and 10 are disposed so that the extension lines in the respective sensing directions intersect with one another at one point. By this disposition, the rotational movement of the tool holder 7 around the three axes is performed with the one point (intersection) as the center, and therefore, movements of the tool holder 7 can be prevented from being complicated, and the time taken to calculate for correcting the positioning error of the cutting edge of the tool 6 can be shortened.

In the conventional uniaxial tool unit, the tool holder, the displacement sensors and the tool are disposed so that the center lines thereof are aligned with each other. The disposition is the most ideal disposition that minimizes the error of "abbe", and is desirable disposition from the point of view where the drive axis by the actuator and machining point are matched with each other and generation of unnecessary moment can be avoided.

However, when this uniaxial constitution is developed to the triaxial tool unit, the triaxial tool unit becomes larger than necessary. Therefore, at the time of actual machining, problems such as contact of the triaxial tool unit and the workpiece occur, and limitation in practical use becomes large. Since the distance (off set amount: 1z in FIG. 2) between the intersection of the extension lines in the sensing directions of the three displacement sensors and the cutting edge of the tool becomes long, there also arises a problem in which positional control of the cutting edge with high accuracy becomes difficult.

Thus, in the triaxial tool unit in this embodiment 1, the sensors 8, 9 and 10 are disposed at the positions different from the axial lines in the operating directions of the actuators 3, 4 and 5 as shown in FIGS. 1 and 2. In this case, the sensors and the tool are preferably disposed so that the cutting edge of the tool is located on the extension line in the sensing direction of at least one sensor of the three sensors. The sensor and the tool are desirably disposed so that the cutting edge of the tool is located at the intersection on the extension lines in the sensing directions of the aforementioned three sensors.

As shown in FIG. 2, in the embodiment 1, the cutting edge of the tool 6 is located on the extension line in the sensing direction of the sensor 10 which measures the displacement amount in the Z-axis direction of the actuator 5 of the Z axis. By this constitution, the influence by the rotational movement around the Z axis can be made small. Likewise, if the cutting edge of the tool 6 is located on the extension lines in the sensing directions of the sensors 8 and 9, the influence by the rotational movements around the X and Y axes can be made small.

When the piezoelectric element is used as the actuator, the piezoelectric element is likely to be broken when a tensile force is applied to the piezoelectric element since the piezoelectric element is weak against the tensile force. Therefore, the piezoelectric elements are generally used with preload applied thereto.

Figure 4:
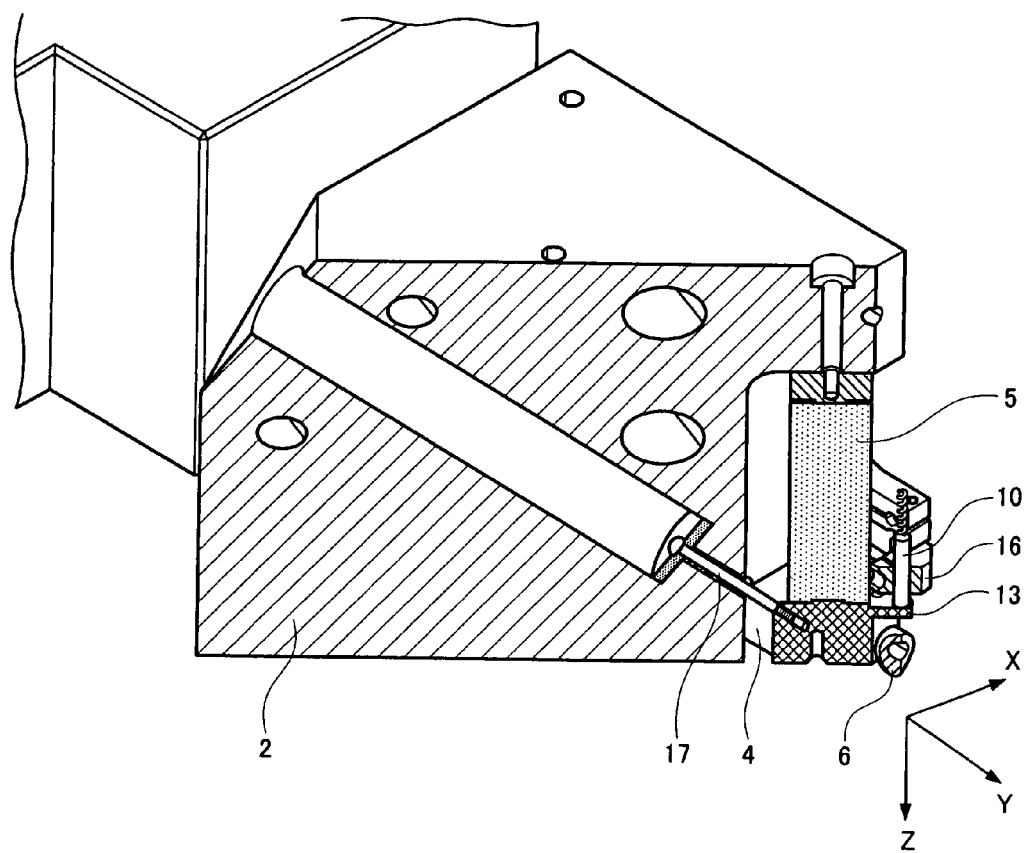
FIG. 4 is a sectional view showing the structure of a preload of the triaxial tool unit in the embodiments 1 and 2 of the present invention.

FIG. 4 shows a sectional view showing the structure of the preload in the embodiment 1. The triaxial tool unit in the embodiment 1 has a structure in which preload is applied to the three actuators 3, 4 and 5 from the direction which is not parallel with any axis of the X, Y and Z axes by one preload rod 17. Specifically, the triaxial tool unit 1 has a symmetrical structure of the three axes (X, Y and X axes), and therefore, preload is applied from the direction forming 45 degrees with each of the X, Y and Z axes (diagonal direction of the tool holder 7). By adopting such a structure, preload can be uniformly applied to the three actuators 3, 4 and 5 from one spot. As a result, the effect of equalizing the mechanical characteristics and control characteristics of the three actuators 3, 4 and 5 to one another is provided.

Figure 5:
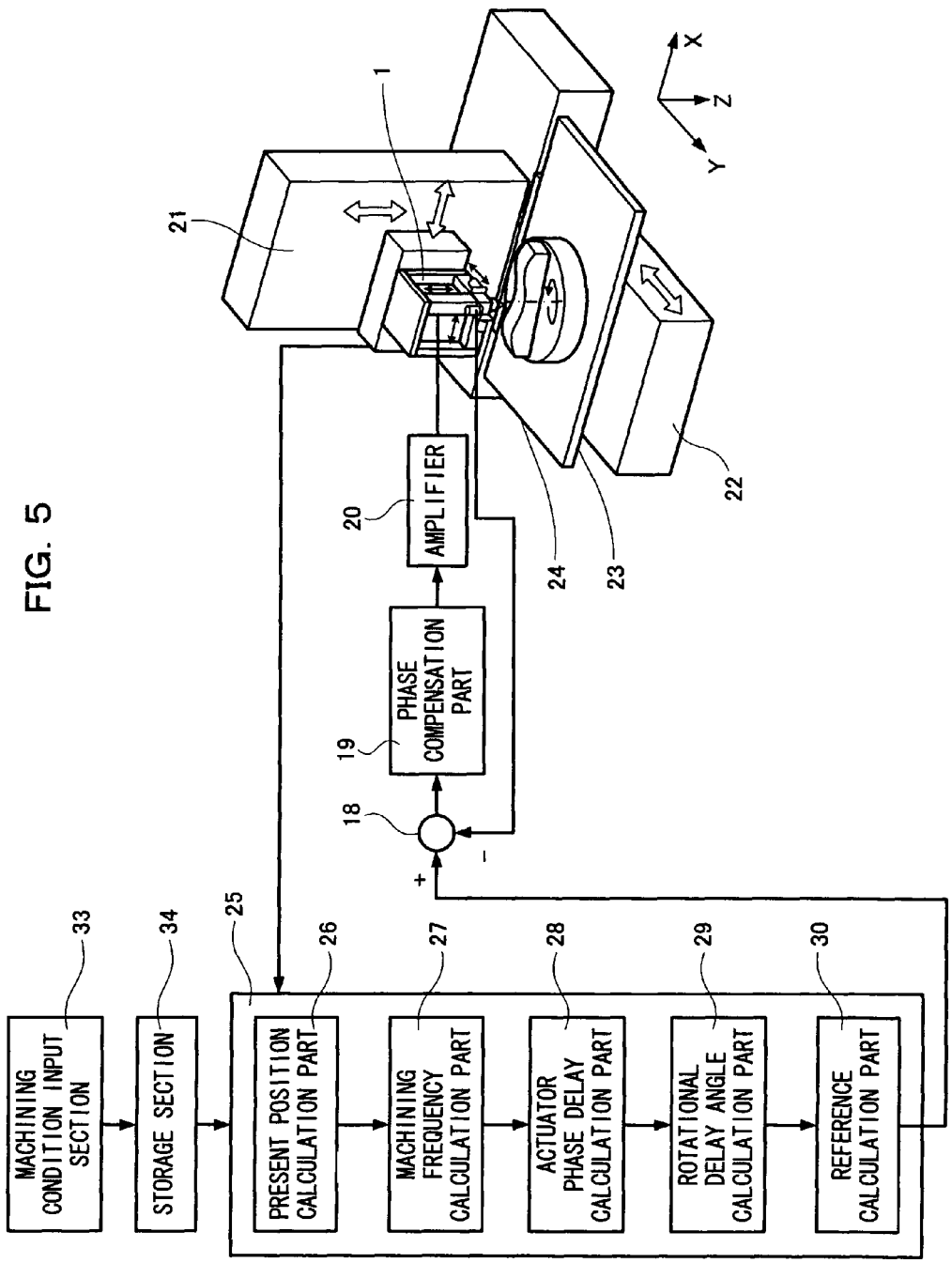
FIG. 5 is a diagram showing the constitution of a main part for explaining a machining device in the embodiment 1 of the present invention.

Subsequently, the positional control method of the three actuators 3, 4 and 5 will be described by using FIG. 5. FIG. 5 is a diagram showing the constitution of the main part for explaining a machining device loaded with the above described triaxial tool unit 1. FIG. 5 illustrates a positional control loop circuit for position-controlling the actuator 5 of the Z axis.

As shown in FIG. 5, the positional control loop circuit is comprised of an adder 18 which calculates the deviation of the displacement signal from the sensor 10 and the reference (command signal), a phase compensation part 19 which performs phase compensation by performing, for example, integral processing (I control), proportional integral processing (PI control), proportional-plus-integral-plus-derivative processing (PID control) and the like for the signal from the adder 18, and an amplifier 20 which generates a drive signal which controls the operation of the actuator 5 by power-amplifying the signal from the phase compensation part 19.

By the positional control loop, feedback control which keeps the regular space between the above described sensor 10 and the sensor target 13 can be applied. Concerning the X and Y axes, similar positional control may be performed by constituting similar positional control loop circuits.

Subsequently, a method for lathing a workpiece by the machining device loaded with the triaxial tool unit 1 will be described with the case of lathing the surface of the workpiece to be machined into a non-circular-arc cylindrical shape as an example. The processing machine of the machining device includes an X/Z-axis table 21 which moves the triaxial tool unit 1 in the X-axis direction and the Z-axis direction, and a Y axis table 22 which moves the triaxial tool unit 1 in the Y-axis direction, as linear stages which move the triaxial tool unit 1 in the directions of the orthogonal three axes (X, Y and Z axes) relatively to a workpiece 24 as shown in FIG. 5. The processing machine also includes a rotary table 23 which rotates the workpiece 24, as a rotary table which rotationally moves the triaxial tool unit 1 relatively to the workpiece 24. The linear stages (the X/Z-axis table 21 and the Y-axis table 22) and the rotary stage (rotary table 23) are NC tables, the three axes (three-axis coordinates) and the center axis (angle coordinate) of which are numerically controlled (NC-control).

In the embodiment 1, the case where the triaxial tool unit is mounted on the linear stage and moved in the X, Y and Z axes directions, and thereby the triaxial tool unit is moved relatively to the workpiece is described, but the workpiece may be moved. The case where the workpiece is mounted on the rotary stage and rotated, and thereby, the triaxial tool unit is circularly moved relatively to the workpiece is described, but the triaxial tool unit may be circularly moved. In the embodiment 1, the case where the rotary table has one axis is described, but it may have at least two axes.

The machining device lathes the workpiece 24 by circularly moving the triaxial tool unit 1 relatively to the workpiece 24 while adjusting the relative position of the triaxial tool unit 1 (cutting edge of the tool 6) to the workpiece 24 by performing numerical control (NC control) of the tree-axis coordinates of the X/Z-axis table 21 and the Y-axis table 22 and the angular coordinate of the rotary table 23 based on the machining program stored in the storage section 34. Specifically, with respect to the workpiece 24 which is rotating, the triaxial tool unit 1 (tool 6) is moved to the center of rotation from the outer peripheral side of the workpiece 24. Concerning the constitution in which lathing is performed by numerically controlling the three-axis coordinates of the X/Z-axis table 21 and the Y-axis table 22 and the angular coordinate of the rotary table 23, the constitution of the NC control already known is used, and therefore, the constitution is not illustrated here.

It is generally difficult to operate the X/Z-axis table 21 and the Y-axis table 22 at a high speed with high accuracy in the order of nanometer. Therefore, the machining device lathes a workpiece by minutely operating the tool 6 of the triaxial tool unit 1 in the three-dimensional directions in the machining range corresponding to the three-axis coordinate for each three-axis coordinate of the linear stage. The machining range can be expressed by the angular coordinate of the rotary stage. The machining range corresponding to one three-axis coordinate is not limited to one, but depending on the machining shape, a plurality of machining ranges corresponding to one three-axis coordinate exist in some cases. In the embodiment 1, the triaxial tool unit 1 (tool 6) is moved to the center of rotation from the outer peripheral side of the workpiece 24 along the X-axis direction, and therefore, lathing is performed by minutely operating the tool 6 for each X-axis coordinate.

Minute three-dimensional operation of the tool 6 is performed with a reference calculation processing section 25 calculating command signals (references) of the actuators 3, 4 and 5 in real time, outputting the signals to the positional control loop circuits of the actuators 3, 4 and 5, and by driving the actuators 3, 4 and 5.

Hereinafter, the reference calculation processing section 25 will be described. The calculation processing part 25 obtains in real time the references of the displacement amounts of the actuators 3, 4 and 5 in accordance with the three-axis coordinate of the X/Z-axis table 21 and the Y-axis table 22 and the angular coordinate of the rotary table 23, and generates the command signals of the actuators 3, 4 and 5.

As shown in FIG. 5, the reference calculation processing section 25 includes a present position calculation part 26, a machining frequency calculation part 27, an actuator control phase delay calculation part 28, a rotation delay angle calculation part 29 and a reference calculation part 30.

The present position calculation part 26 inputs therein information from the processing machine, which indicates the present three-axis coordinates of the X/Z-axis table 21 and the Y-axis table 22 and the present angular coordinate of the rotary table 23, and calculates the present tree-axis coordinates (x, y, z) and the angular coordinate (θ) so that calculation can be performed in the calculation processing unit 25. In this case, the three-axis coordinates (x, y, z) are the coordinates when the center of rotation of the workpiece 24 is set as the program origin.

For example, when the information indicating the tree-axis coordinates and the angular coordinate is inputted by pulse train from the processing machine, the present position calculation part 26 counts the pulse trains with a counter, and obtains the present three-axis coordinates (x, y, z) and the angular coordinate (θ) from the sensitivity (distance per one pulse) defined in the mechanical specifications of the processing machine.

The machining frequency calculation part 27 calculates in real time the operation frequencies of the actuators 3, 4 and 5 in the machining range corresponding to the present three-axis coordinates (x, y, z) calculated in the calculation part 26. Hereinafter, the operation frequency in the machining range shall be called machining frequency.

Figure 6:
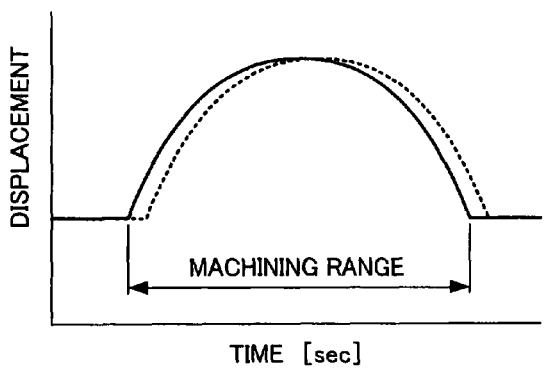
FIG. 6 is a waveform chart showing a command signal and actual movement of an actuator in the embodiment 1 of the present invention.

FIG. 6 is a diagram showing the command signal and the actual operation of the actuator. In FIG. 6, the solid line shows the command signal to the actuator 5 of the Z axis in a certain machining range in which the tool 6 and the workpiece 24 contact each other, and the broken line shows the actual operation of the actuator 5 with respect to the command signal. The section in which the waveform is displaced as shown in FIG. 6 is the machining range, and the operation frequency of the actuator in the machining range is the machining frequency. As shown in FIG. 6, the operation of the actuator 5 is delayed with respect to the command signal, and the delay becomes larger as the machining frequency becomes higher.

As the tool 6 is moved to the center of rotation from the outer peripheral side of the workpiece 24 in the embodiment 1, the machining frequencies of the actuators 3, 4 and 5 are calculated in real time for each X-axis coordinate x of the X/Z-axis table 21. For example, when the rotational speed of the rotary table 23 is $S[\text{min}^{-1}]$, the X-coordinate (the distance in the X-axis direction from the center of rotation of the workpiece 24 to the triaxial tool unit 1) is $x1[\text{m}]$, and the distance by which the workpiece is machined in the machining range corresponding to the X-axis coordinate $x1[\text{m}]$ thereof is $W[\text{m}]$, the machining frequency $f1[\text{s}^{-1}]$ of each of the actuators 3, 4 and 5 is obtained from the following formula 1.

$$f1 = \frac{\pi \times x1 \times S}{60 \times W} \quad \text{(Formula 1)}$$

In this case, the rotational speed S of the rotary table can be obtained from the machining range conditions inputted from an after-mentioned machining condition input section 33 and stored in the storage section 34. The distance W by which the workpiece is machined can be obtained from the information related to the surface shape of the workpiece which is inputted from the machining condition input section 33 and stored in the storage section 34. In the embodiment 1, as shown in FIG. 5, two machining ranges corresponding to one X-axis coordinate exist, and the explanation is made by assuming that the distances W by which the workpiece is machined are the same. It goes without saying that when the distance W by which the workpiece is machined significantly differs for each of a plurality of machining ranges corresponding to one X-axis coordinate, the machining frequency is obtained for each machining range.

The actuator control phase delay calculation part 28 calculates the phase delay (phase delay with respect to the command signal of the signal controlling the operation of the actuator which is generated by the positional control loop circuit) of actuator control with respect to the machining frequency calculated in the calculation part 27. In detail, the phase delays of the actuator control with respect to all frequencies are obtained by measuring or calculating a closed loop frequency response of each positional control loop circuit in advance, and based on the phase delays obtained in advance and the machining frequency f1 calculated in the calculation part 27, a phase delay φ [deg] with respect to the machining frequency f1 is obtained. Since the method for obtaining the phase delays of the actuator control with respect to all frequencies by calculation includes a model error, actual measurement is more favorable in accuracy in many cases. Hereinafter, an explanation will be made of the case where the positional control loop circuits of the actuators 3, 4 and 5 of the X, Y and Z axes have the same constitutions as an example.

Figure 7:
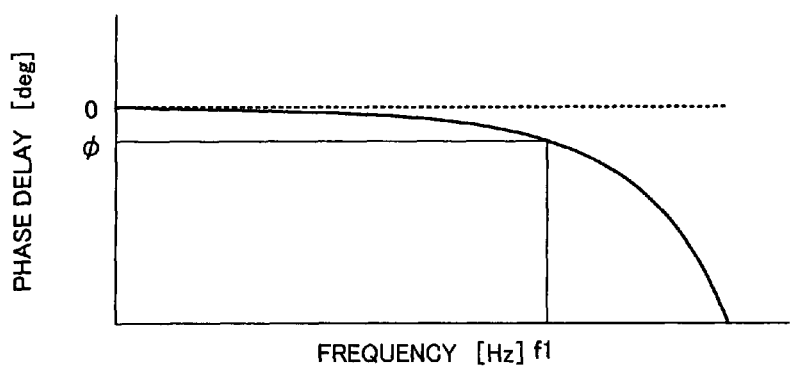
FIG. 7 is a frequency characteristic chart showing a phase delay of actuator control in the embodiment 1 of the present invention.

FIG. 7 shows the phase delays of the actuator control with respect to all frequencies. This frequency characteristic is inputted from the after-mentioned machining condition input section 33 as a polynomial with the frequency as a parameter, and is stored in the storage section 34 in advance. The actuator control phase delay calculation part 28 substitutes the machining frequency f1 calculated in the calculation part 27 into the above described polynomial and calculates in real time the phase delay φ with respect to the machining frequency f1.

Alternatively, a lookup table of the phase delays of the actuator control with respect to all frequencies may be created in advance, and may be inputted from the after-mentioned machining condition input section 33, and stored in the storage section 34 in advance. In this case, the actuator control phase delay calculation part 28 obtains the phase delay φ corresponding to the machining frequency f1 calculated in the calculation part 27 by referring to the lookup table. When the positional control loop circuits of the actuators 3, 4 and 5 do not have the same frequency characteristics, the phase delay is obtained for each of the positional control loop circuits.

In this manner, the actuator control phase delay calculation part 28 calculates the phase delay φ with respect to each of the command signals of the drive signals of the actuators 3, 4 and 5 based on the machining frequency f1 of the actuators 3, 4 and 5 and the frequency characteristics of the positional control loop circuits.

The rotational delay angle calculation part 29 calculates a rotational angle (rotational delay angle) θ1[deg] of the rotary table 23 by the operation delay amount with respect to each of the command signals of the actuators 3, 4 and 5 based on the machining frequency f1 calculated in the calculation part 27 and the phase delay φ calculated in the calculation part 28.

That is, the rotational delay angle calculation part 29 determines how many degrees ahead of the angular coordinate of the rotary table 23 when the tool 6 enters the machining range the calculation for obtaining the reference needs to be started in order that the actuators 3, 4 and 5 start operation from predetermined positions in consideration of the phase delays.

For example, when the rotational speed of the rotary table 23 is S[min$^{-1}$], the X-axis coordinate is x1[m], the machining frequency corresponding to the X-axis coordinate x1[m] is f1[s$^{-1}$], and the phase delay of the actuator control with respect to the machining frequency f1 is φ[deg], the rotational delay angle θ1 is obtained from the following formula 2.

$$\theta 1 = \frac{S \times \phi}{2 \times f1} \quad \text{(Formula 2)}$$

As shown in the above described formula 2, the rotational delay angle θ1[deg] is determined by the ratio of the phase delay φ and the machining frequency f1. When the positional control loop circuits of the actuators 3, 4 and 5 do not have the same frequency characteristics, the rotational delay angle is obtained for each axis.

Figure 8:
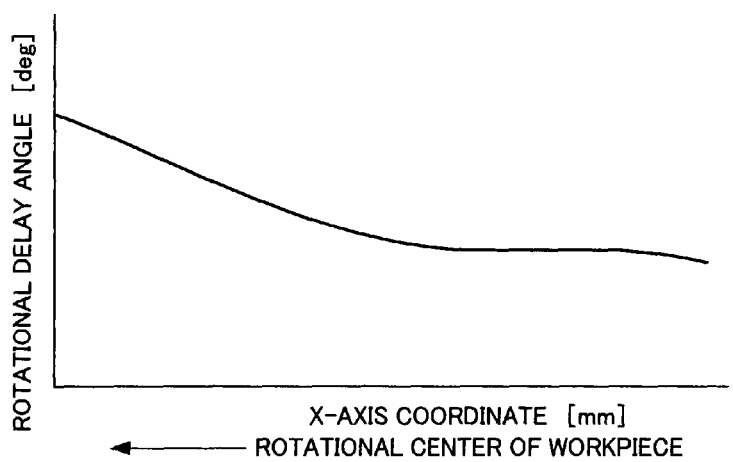
FIG. 8 is a characteristic chart showing a rotational delay angle of a spindle in the embodiment 1 of the present invention.

FIG. 8 shows the characteristic of the rotational delay angle with respect to the X-axis coordinate when the rotational frequency of the rotary table 23 is constant. As shown in FIG. 8, the rotational delay angle θ1 becomes larger as the tool is closer to the rotation center of the workpiece.

The rotary table may be rotated at a constant linear velocity. However, in this case, in order to match the rotational frequency of the inner periphery to the rotational frequency of the outer periphery, the rotational frequency of the rotary table 23 needs to be increased as the tool 6 approaches the inner periphery, and it is conceivable that the rotary table 23 reaches the rotational frequency of the rotatable limit at a certain point. Thus, in such a case, the range at the constant linear velocity is divided into several stages, and the machining frequency and the rotational delay angle are calculated for each stage.

The rotational delay angle θ1 calculated in the calculation part 29 is inputted into the reference calculation part 30. The reference calculation part 30 starts calculation of each reference ahead, by the rotational delay angle θ1, of the angular coordinate of the rotary table 23 at the time of the tool 6 actually entering the machining range. The angular coordinate of the rotary table 23 at the time of the tool 6 actually entering the machining range can be obtained from the information related to the surface shape of the workpiece which is inputted from the after-mentioned machining condition input section 33 and stored in the storage section 34, and the like. The reference is obtained based on the information related to the surface shape of the workpiece which is inputted from the machining condition input section 33 and stored in the storage section 34, and the like, and the coordinates (x, y, z, θ) calculated in the present position calculation part 26.

Here, the machining condition input section 33 will be described. The command values and the machining ranges of the three actuators differ depending on the machining shape. The phase delay of the actuator depends on the size and performance of the actuator, the size of the tool, the performance of the amplifier and the like. Accordingly, in order to obtain a desired machined shape, the machining device in the embodiment 1 is provided with the machining condition input section 33 so that a user can input the required formula and data among the arithmetic equation for obtaining the respective command values of the three actuators (optical design equation defining the surface shape of the workpiece), the machining range conditions such as the rotational frequency and the feed rate of the workpiece, the formula or data for obtaining the phase delay of the actuator control, various kinds of parameters set in accordance with the machining conditions (for example, the tip end radius r of the cutting edge of the tool for use), the gain of the phase compensation part and the like, in accordance with the machining shape, machining conditions and the constitution of the triaxial tool unit. The machining condition input section 33 can be constituted by using an already known user interface such as a keyboard and a touch panel. The reference calculation part 30 calculates the reference based on the information of the arithmetic equation for obtaining the respective command values of the three actuators and the like which is inputted from the machining condition input section 33 in advance and the coordinates (x, y, z, θ) calculated in the calculation part 26.

The reference calculation part 30 calculates the references of the actuators 3, 4 and 5 in real time and outputs the values to the respective positional control loop circuits. As a result, the actuators can be operated as the command signals at the same time when the tool enters the machining range, and lathing can be performed with high accuracy.

As described above, according to the machining device in the embodiment 1, the machining frequency for each X-axis coordinate of the X/Z-axis table 21 and the phase delay of actuator control with respect to the machining frequency are obtained in real time, and before the tool 6 enters the machining range corresponding to the X-axis coordinate, it is obtained what degrees ahead of the angular coordinate of the rotary table 23 at the time of the tool 6 entering the machining range the calculation of the reference needs to be started, and the calculation of reference is started before the tool 6 enters the machining range, whereby at the same time when the tool 6 enters the machining range or at the stage which is as early as possible in the lathing period of the machining range, the actuators can be operated.

Figure 9:
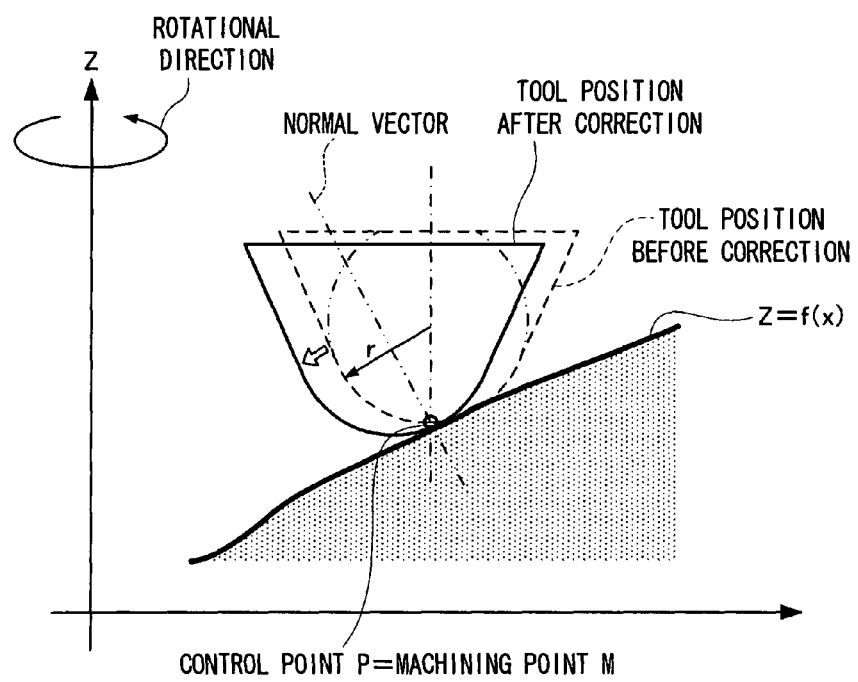
FIG. 9 is an explanatory diagram for explaining the machining operation of the machining device in the embodiment 1 of the present invention.
Figure 20:
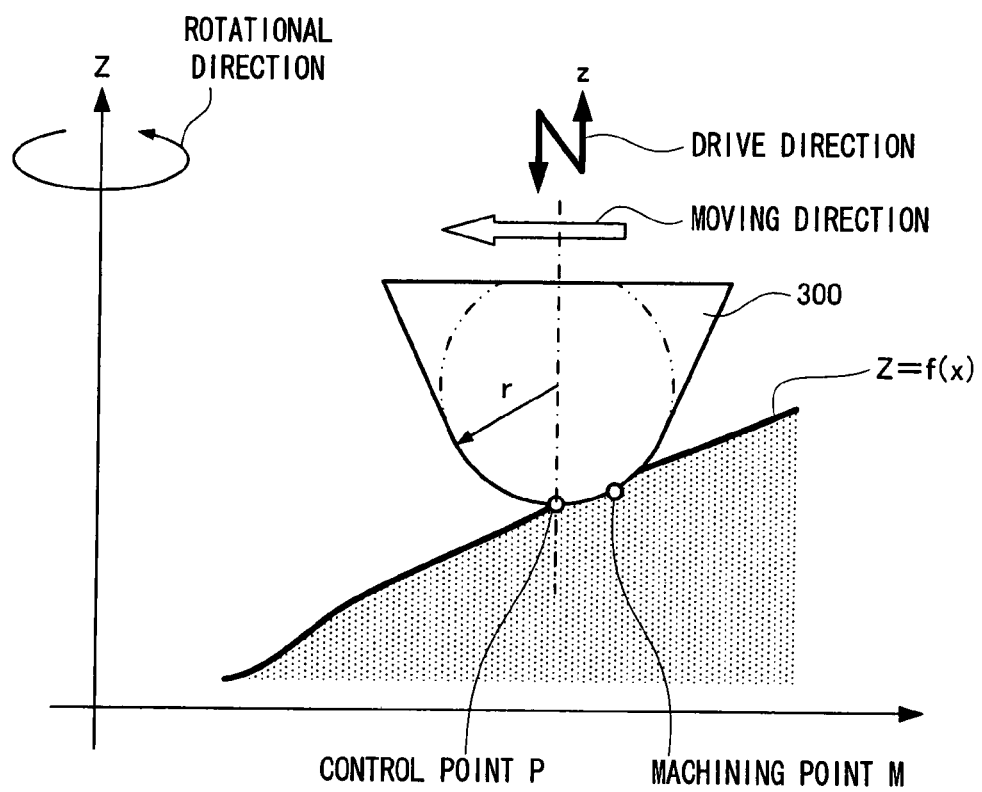
FIG. 20 is an explanatory diagram for explaining a machining operation of a conventional high-speed positioning mechanism of a uniaxial constitution.

Subsequently, the machining operation of the machining device loaded with the above described triaxial tool unit will be described in detail by using FIG. 9. FIG. 9 is an explanatory diagram for explaining the machining operation of the machining device loaded with the above described triaxial tool unit. Herein, an explanation will be made with machining for creating the rotational symmetrical surface defined by the function z=f(x) as an example so as to be compared with the machining operation of the conventional high speed positioning mechanism of the uniaxial constitution shown in FIG. 20.

The reference calculation part 30 calculates the position in the Z-axis direction of the control point P on the machining surface defined by the function z=f(x) based on the information of the arithmetic equation obtaining the respective command values of the three actuators which is inputted from the machining condition input section 33, and the like, and the coordinates (x, Y, z, θ) calculated in the present position calculation part 26. At the same time, the reference calculation part 30 analytically calculates the normal vector of the machining surface at the control point P. Then, the reference calculation part 30 calculates the reference so that the center point of the tip end radius r of the cutting edge of the tool 6 moves to the position offset by "r" from the control point P on the calculated normal vector. As a result, the interference point (actual machining point) M with which the cutting edge interferes and the control point P coincide with each other.

In the example of machining for creating the rotational symmetrical surface, the tool simply has to be moved on the X-Z plane. Similarly, in machining for creating a nonaxisymmetric aspheric surface, the tool simply has to be moved three-dimensionally within the X-Y-Z plane. The above calculations in the reference calculation processing section 25 can be analytically carried out, and are not accompanied by convergence calculation or the like, and therefore, can be processed in real time even at the present technological level. Therefore, the tool can be three-dimensionally operated at a high speed. Further, it is not necessary to create machining data in advance. In other words, tremendous time is not required for creation of NC data, and therefore, this method is a practical machining method.

Machining is sequentially performed while the references of the three actuators 3, 4 and 5 are obtained by calculating the control point (the position to be machined next: machining point) P in real time, and therefore, a nonaxisymmetric aspheric surface can be created in a short time as if the surface were machined by a lathe. Since the machining time is short, a change in the machining environment is small, the machining surface can be finished with high accuracy, and the method is a highly efficient machining method.

Even when the tool is exchanged to the one with different radius of the cutting edge, the value of the tip end radius r of the tool simply has to be changed through the machining condition input section 33. Similarly, when machining accuracy does not reach predetermined accuracy after machining and remachining is performed to correct shape accuracy, the parameter of the optical design equation simply has to be directly changed, or only a new correction equation simply has to be added to the optical design equation, through the machining condition input section 33.

When machining is performed by moving the tool toward the inner periphery from the outer periphery as in the embodiment 1, the moving speed is made constant, whereby a tool trajectory space (feed pitch) in the radius direction becomes constant, and improvements in the machined surface roughness can be expected.

Figure 10:
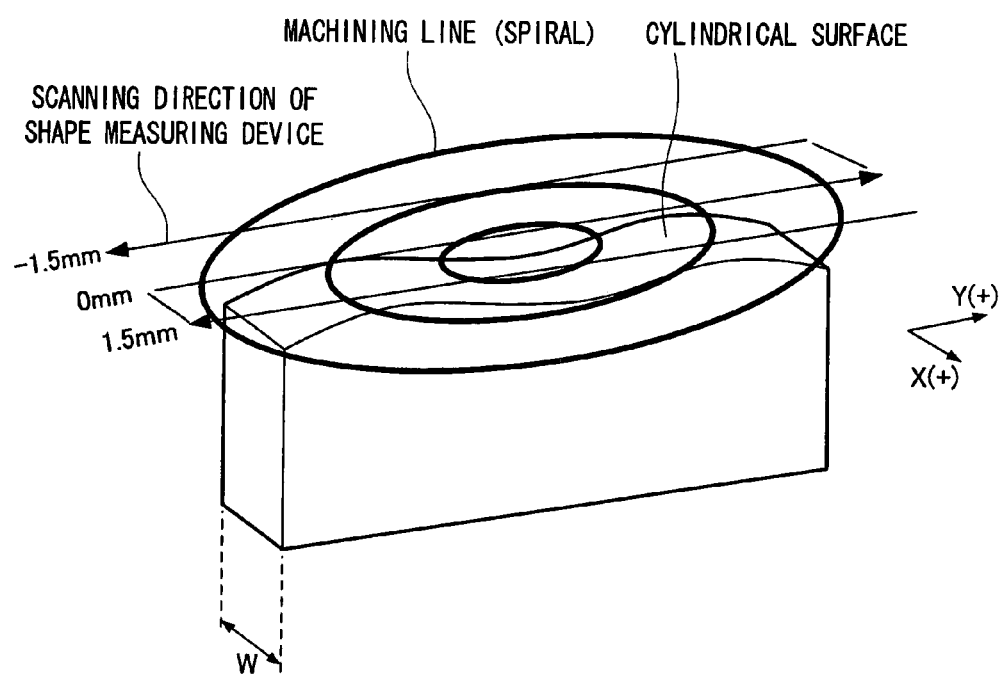
FIG. 10 is a schematic view for explaining a workpiece in the embodiments 1 and 2 of the present invention.

Subsequently, by using FIGS. 10 and 11, machining accuracy of the machining device loaded with the triaxial tool unit in the embodiment 1 will be described. FIG. 10 shows an example of a workpiece of which surface to be machined is lathed in a non-circular arc cylindrical shape by driving each actuator while moving the tool to the center of rotation from the outer peripheral side of the rotating workpiece by the machining device loaded with the triaxial tool unit in the embodiment 1. In this example, the size of the surface to be machined is 4 mm in the X-direction shown in FIG. 10 and 60 mm in the Y-direction.

When such a precision component is lathed, W (thickness of the workpiece) shown in FIG. 10 may be substituted as the "distance W by which the workpiece is machined" which is a parameter of the above described (Formula 1), and an approximate value of the machining frequency for each X-axis coordinate may be obtained. However, in the example shown in FIG. 10, the thickness of the workpiece is used as the distance W by which the workpiece is machined, but when the machining distance is actually smaller than the thickness, the actual distance is used.

Figure 11A:
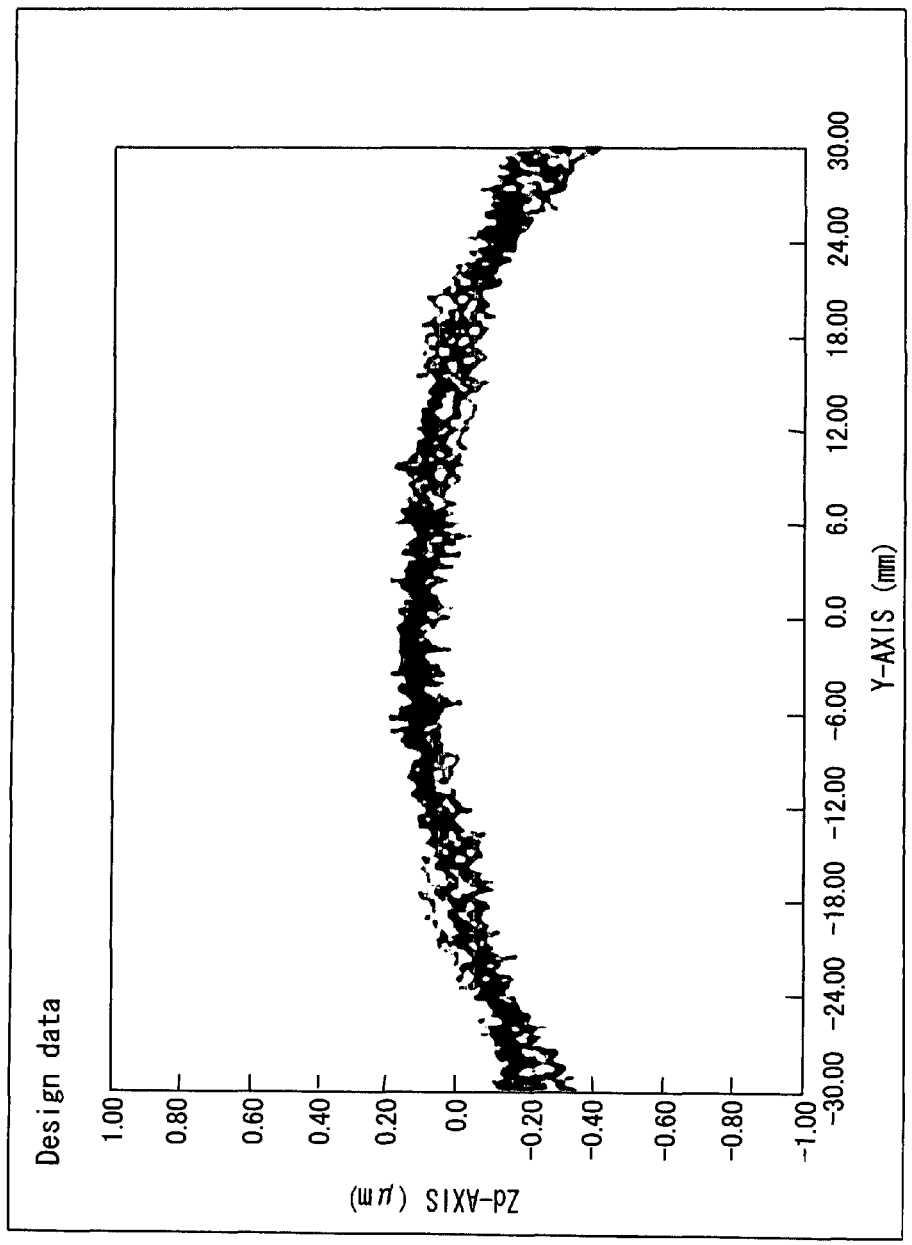
FIGS. 11A and 11B are diagrams showing graphs expressing machining results in the embodiment 1 of the present invention.

FIG. 11A shows the result of measuring the sectional shape of the workpiece after machined shown in FIG. 10 by scanning it in the Y direction at the positions of X=0 mm, X=1.5 mm and X=−1.5 mm shown in FIG. 10. For comparison, an example of the measurement result when lathing is performed without using the above described reference calculation processing section 25 is shown in FIG. 11B.

Figure 11B:
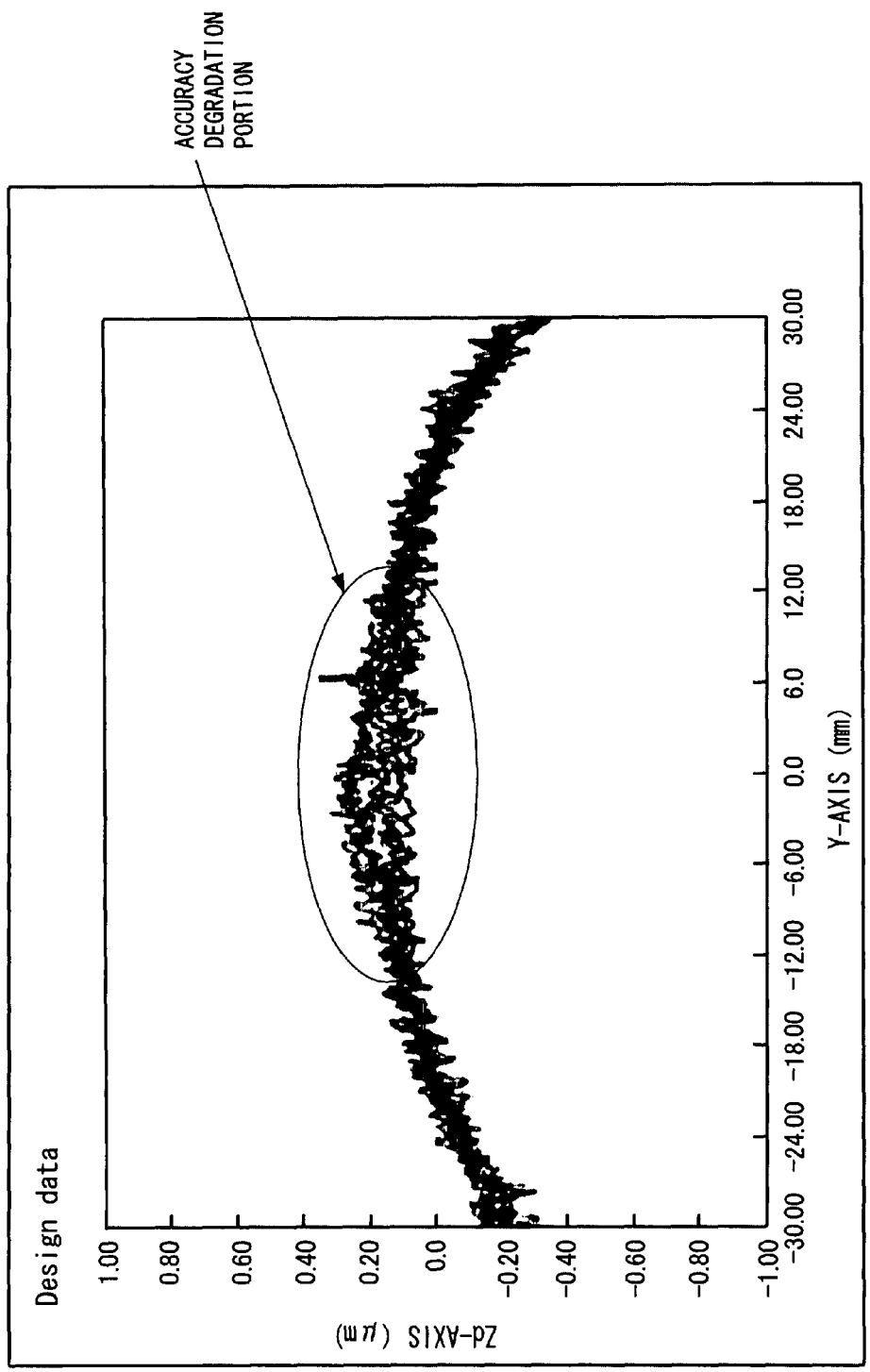

In the graph shown in FIGS. 11A and 11B, the vertical axis shows the shape accuracy expressing the difference between the design value and the machining result. In the graphs shown in FIGS. 11A and 11B, shape accuracies of the three sectional shapes at the aforementioned positions of X=0 mm, X=1.5 mm and X=−1.5 mm are overwritten on one another.

As shown in FIG. 11B, it is found out that when lathing is performed without using the above described reference calculation processing section 25, the three sectional shapes do not have the same shape error in the vicinity of the center of the workpiece. It is conceivable that this is because the characteristics of the machining frequency differ in the outer periphery and in the vicinity of the center.

When lathing is performed by the machining device in the embodiment 1, the difference in the shape accuracy in the vicinity of the center of the data which can be seen in FIG. 11B can be eliminated as shown in FIG. 11A.

As described above, according to the embodiment 1, the reference which is obtained by correcting an error caused because the movement of the tool cannot sufficiently follow the command, and an error caused by the tool cutting edge having the limited size can be calculated in real time, and machining can be performed in a overwhelmingly short time as compared with the conventional tool. High-speed ultra precision machining can be performed by three-dimensionally operating the tool with high accuracy, and precision components such as optical components having microscopic shapes and precision mechanism components can be machined at a high speed with high accuracy with the same method as the axisymmetric machining method represented by lathing.

When the workpiece is face-cut by using the machining device in the embodiment 1 as shown in FIG. 10, machining is finished in a short time (machining time of one hour) which is ⅛ as compared with the case where the workpiece is face-cut as shown in FIG. 10 by using the conventional cutting method called a raster fly cut method as shown in FIG. 10.

Embodiment 2

Figure 12:
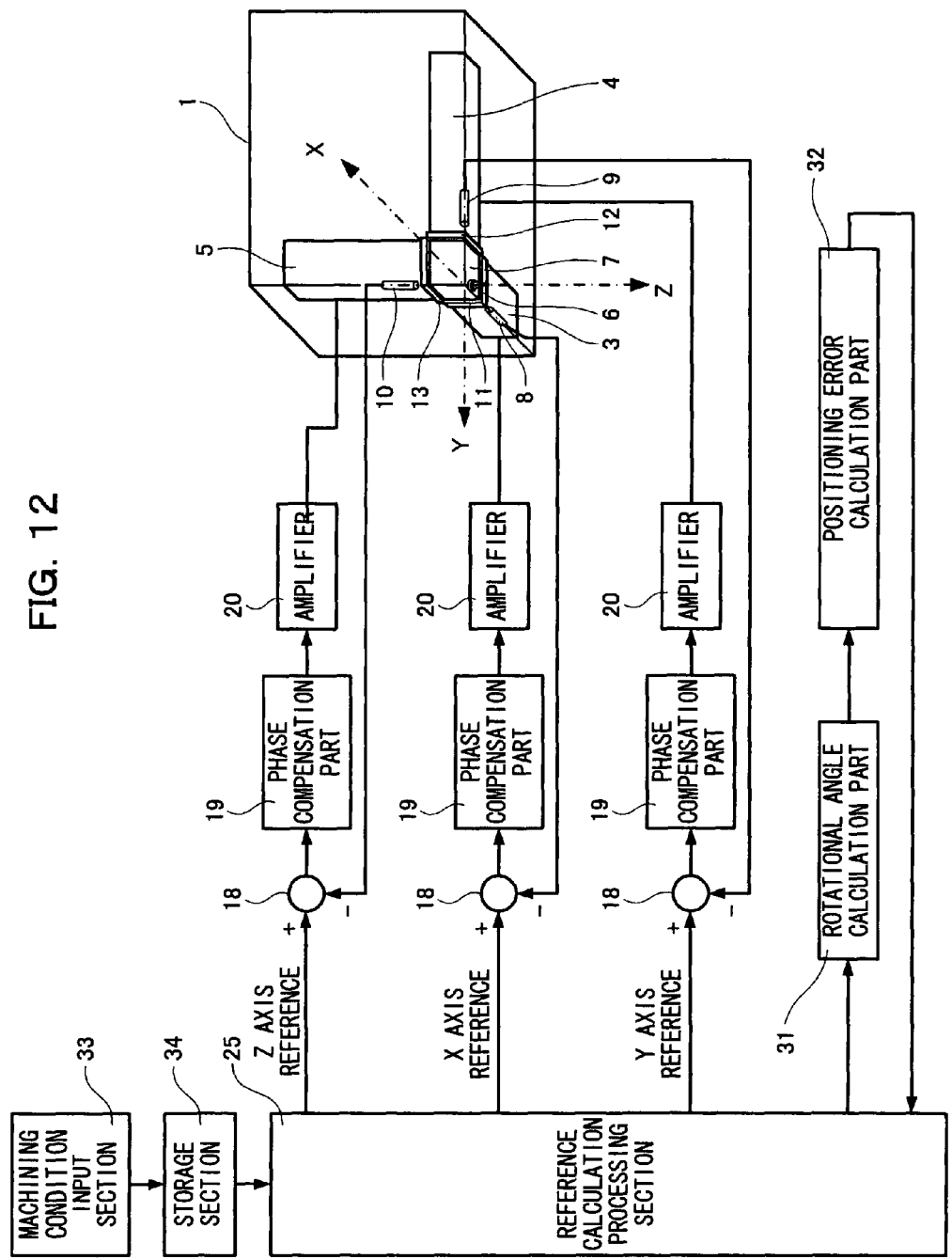
FIG. 12 is a diagram showing the constitution of a main part for explaining the machining device in the embodiment 2 of the present invention.

FIG. 12 is a diagram showing the constitution of a main part for explaining a machining device loaded with a triaxial tool unit in an embodiment 2 of the present invention. The same members as those described in the aforementioned embodiment 1 are given the same reference numerals and characters, and an explanation of the members will be omitted.

The machining device in the embodiment 2 differs from the above described embodiment 1 in that in a rotational angle calculation part 31 and a positioning error calculation part 32 shown in FIG. 12, a positioning error caused to the cutting edge of the tool 6 due to the operation of each of the actuators 3, 4 and 5 is obtained, and the reference calculation processing section 25 corrects the reference for each of the actuators 3, 4 and 5 by using the obtained error amount, but the other constitutions, for example, the triaxial tool unit 1, the processing machine, the basic positional control loop circuits for controlling the triaxial tool unit 1 and the like are the same as the above described embodiment 1.

As described in the aforementioned embodiment 1, by disposing the sensors 8, 9 and 10 so that the extension lines in the respective sensing directions intersect with one another at one point, the tool holder 6 rotationally moves with the one point (intersection) as the center. The intersection shall be called the center of the rotational movement.

When the center of the rotational movement and the cutting edge of the tool coincide with each other, the influence of the rotational movements around the X, Y and Z axes becomes small, and the positional control of the cutting edge with high accuracy becomes possible, but the constitution in which the center of the rotational movement and the cutting edge coincide with each other is difficult in some cases. For example, if the constitution in which the center of the rotational movement and the cutting edge coincide with each other is adopted, there is the possibility that the sensor and the workpiece contact each other during lathing. In this case, the position of the cutting edge needs to be offset from the center of the rotational movement as shown in FIG. 2.

The triaxial tool unit 1 in the embodiment 2 adopts the constitution in which the cutting edge is offset by "1z" in the Z-axis direction as shown in FIG. 2. When the position of the cutting edge is offset from the center of the rotational movement like this, the cutting edge is desired to be disposed on the extension line in the sensing direction of the sensor 10 which measures the displacement amount of the actuator 5 of the Z axis in order to make the rotational movement around the Z axis which has the largest influence on the shape accuracy small.

Figure 13:
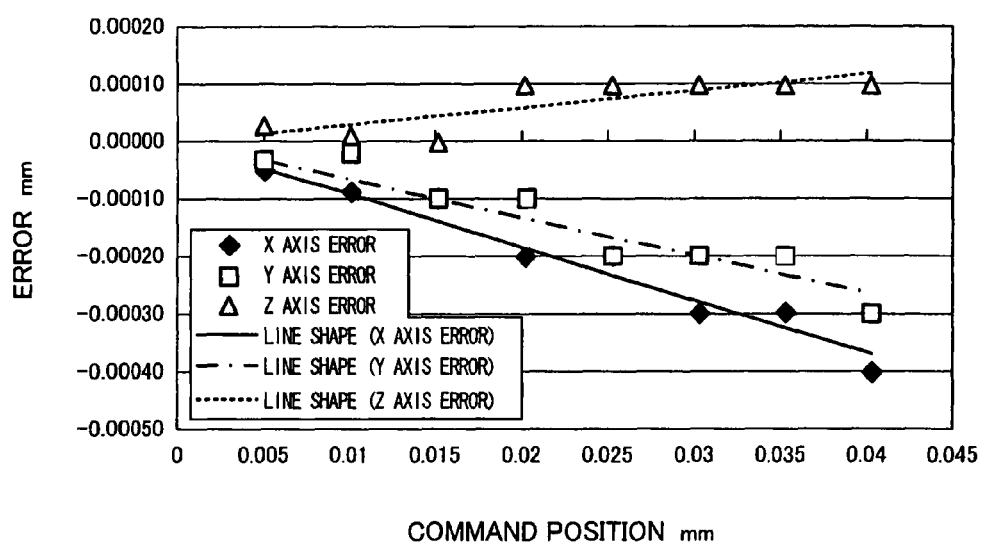
FIG. 13 is a diagram showing one example of the simulation result of a positioning error of a cutting edge in the embodiment 2 of the present invention.

The result of simulating a positional error caused to the cutting edge in the constitution shown in FIG. 2 is shown in FIG. 13. In this simulation, an offset amount 1z in the Z-axis direction is 6.5 mm, and the positional error caused to the cutting edge when each of the actuators (piezoelectric elements) 3, 4 and 5 is displaced by the same amount is analyzed.

As shown in FIG. 13, when the respective actuators 3, 4 and 5 are displaced by 0.04 mm in the X, Y and Z axes directions, for example, positional errors of about −0.38 μm in the X-axis direction, about −0.28 μm in the Y-axis direction and 0.12 μm in the Z-axis direction are caused. As is understandable from this simulation result, when the position of the cutting edge is offset from the center of the rotational movement, the positioning error which is caused to the cutting edge cannot be ignored due to the influence of the rotational movement around the three axes. Especially in the embodiment 2, the cutting edge is offset in the Z-axis direction. Therefore, positioning accuracy in the X-axis direction and the Y-axis direction becomes worse than positioning accuracy in the Z-axis direction, being influenced by the rotational movements around the X axis and Y axis. Especially when the machined surface requiring the shape accuracy in the order of submicron such as an optical component is produced, this error cannot be ignored. The positioning error is caused by the force of the elastic strains of the three axes of the triaxial tool unit described in the aforementioned embodiment 1. Thus, in the embodiment 2, compensation of this error is performed with the following means.

Specifically, the machining device further includes the rotational angle calculation part 31 which inputs the references (command signals) of the respective axes (actuators 3, 4 and 5) calculated in the reference calculation processing section 25, and calculates a rotational angle α around the X axis, a rotational angle β around the Y axis, a rotational angle γ around the Z axis of the tool holder 7 in the center of the above described rotational movement based on the respective inputted references, and the positioning error calculation part 32 which calculates the positioning error caused to the cutting edge of the tool 6 based on the rotational angles α, γ and β around the three axes calculated in the calculation part 31 and the distance to the cutting edge of the tool 6 from the center of the above described rotational movement, and the reference calculation unit 25 inputs the error amount calculated in the calculation part 32 in real time and corrects the respective references.

Figure 14:
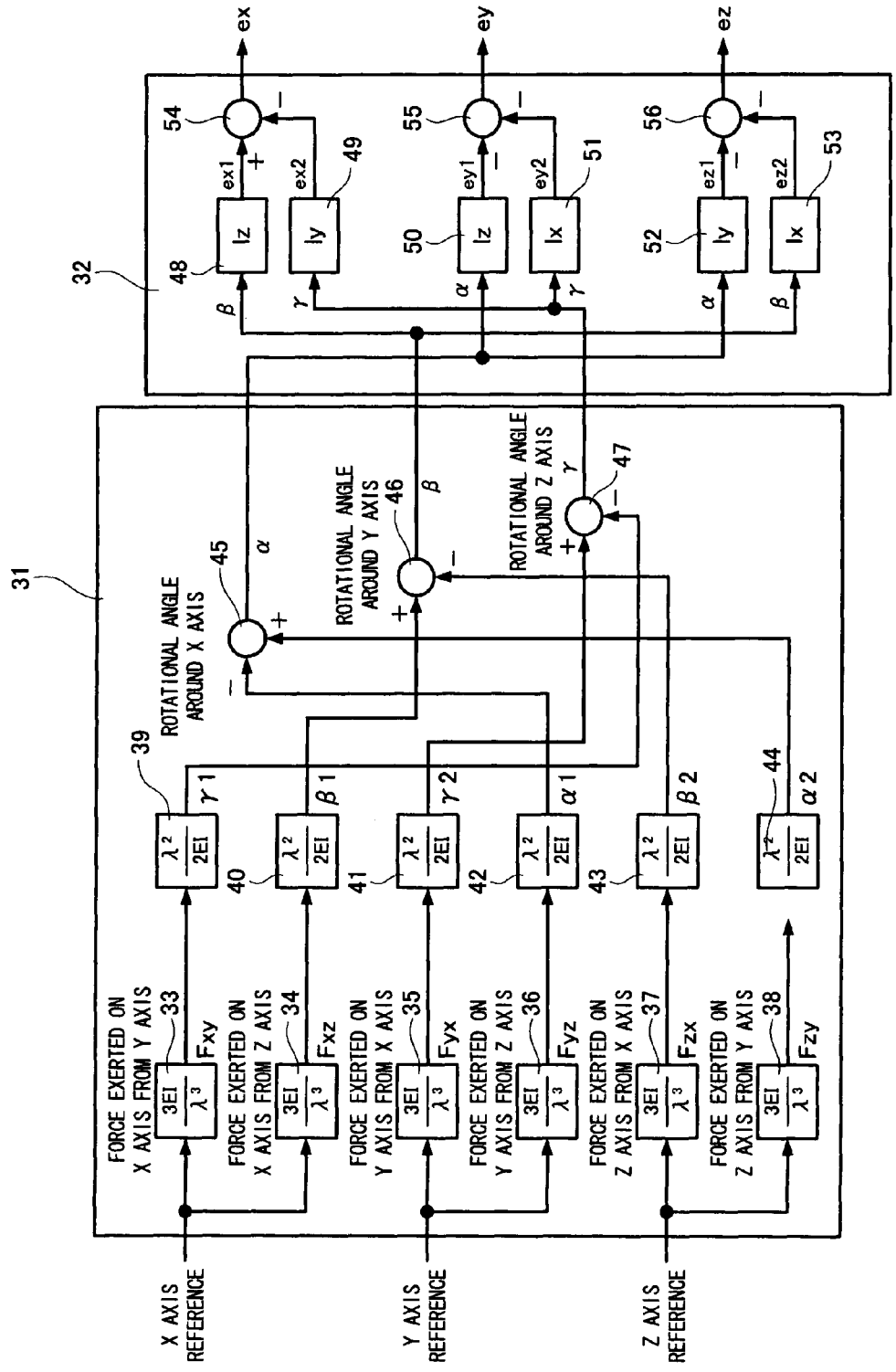
FIG. 14 is a block diagram of a rotational angle calculation part and a positioning error calculation part in the embodiment 2 of the present invention.
Figure 15:
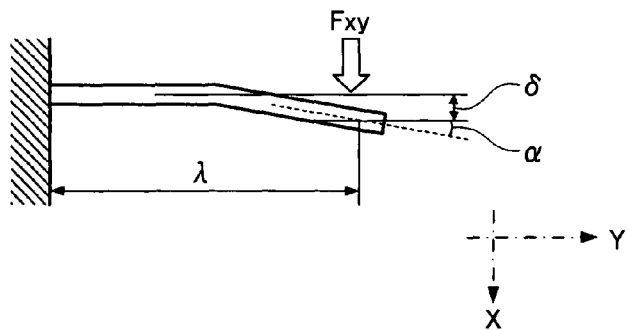
FIG. 15 is an explanatory view of a model of deflection in the embodiment 2 of the present invention.

FIG. 14 is a block diagram showing one example of the processing contents of the rotational angle calculation part 31 and the positioning error calculation part 32. Explaining with a focus on, for example, the X axis, by the actuator 3 pushing and pulling the tool holder 7 in the X-axis direction in accordance with the reference of the X axis, the Y and Z axes receive a force, and elastic strain occurs to the Y and Z axes, whereas a force returning the elastic strain from the Y and Z axes is exerted on the X axis. Explaining this force with the model of deflection of the beam shown in FIG. 15 as an example, the X axis is displaced by δ, and therefore, a force Fxy by the elastic strain exerted on the X axis from the Y axis can be obtained from the following $$\text{Force } Fxy \text{ by the elastic strain} = \frac{3EI}{\lambda y^3} \times \text{displacement amount } \delta \text{ of the } X \text{ axis} \quad \text{(Formula 3)}$$

Here, E represents the Young's modulus of an actuator, I represents the sectional secondary moment of the actuator, and λy represents the distance from the end portion at the side of the supporter 2 of the actuator 4 of the Y axis to the intersection on the axial lines in the operating directions of the respective actuators 3, 4 and 5.

As a result, when the distances from the end portions at the side of the supporter 2 of the respective actuators 3, 4 and 5 to the intersection on the axial line in the operating directions of the respective actuators 3, 4 and 5 are all λ and the same, the force Fxy by the elastic strain exerted on the X axis from the Y axis with respect to the reference (displacement amount) of the X axis is "$(3EI/\lambda^3) \times$ the reference of the X axis". Similarly, a force Fxz by the elastic strain exerted on the X axis from the Z axis with respect to the reference (displacement amount) of the X axis is "$(3EI/\lambda^3) \times$ the reference of the X axis". The same thing applies to the Y axis and the Z axis other than the X axis.

Thus, in the embodiment 2, the rotational angle calculation part 31 calculates the force Fxy "$(3EI/\lambda^3) \times$ the reference of the X axis" by the elastic strain exerted on the X axis from the Y axis with respect to the reference of the X axis in a block 33, and the force Fxz "$(3EI/\lambda^3) \times$ the reference of the X axis" by the elastic strain exerted on the X axis from the Z axis with respect to the reference of the X axis in a block 34, as shown in FIG. 14. Similarly, the calculation part 31 calculates the force Fyx "$(3E1/\lambda^3) \times$ the reference of the Y axis" by the elastic strain exerted on the Y axis from the X axis with respect to the reference of the Y axis in a block 35, and calculates the force Fyz "$(3EI/\lambda^3) \times$ the reference of the Y axis" by the elastic strain exerted on the Y axis from the Z axis in a block 36. The calculation part 31 calculates the force Fzx "$(3EI/\lambda^3) \times$ the reference of the Z axis" by the elastic strain exerted on the Z axis from the X'axis with respect to the reference of the Z axis in a block 37, and calculates the force Fzy "$(3EI/\lambda^3) \times$ the reference of the Z axis" by the elastic strain exerted on the Z axis from the Y axis in a block 38.

By the actuator 3 pushing and pulling the tool holder 7 in the X-axis direction in accordance with the reference of the X axis, the Y and Z axes deflect respectively around the Z axis and the Y axis, and the tool holder 7 rotationally moves around the Z axis and the Y axis. The rotational angle γ1 around the Z axis can be obtained from the following formula 4 by the force Fxy by the elastic strain exerted on the X axis from the Y axis.

$$\text{Rotational angle } \gamma 1 = \frac{\lambda y^2}{2EI} \times \text{force } Fxy \text{ exerted on the } X \text{ axis from the } Y \text{ axis} \quad \text{(Formula 4)}$$

Here, λy is the distance from the end portion at the side of the supporter 2 of the actuator 4 of the Y axis to the intersection on the axial line in the operating directions of the respective actuators 3, 4 and 5.

Similarly, a rotational angle θ1 around the Y axis becomes "(λ²/E1)×Fxz" by the force Fxz by the elastic strain exerted on the X axis from the Z axis when all the distances from the end portions at the side of the supporter 2 of the respective actuators 3, 4 and 5 to the intersection on the axial lines in the operating directions of the respective actuators 3, 4 and 5 are the same and λ.

Thus, in this embodiment 2, the rotational angle calculation part 31 calculates the rotational angle γ1 around the Z axis "(λ²/E1)×Fxy" by the deflection of the Y axis due to the operation of the actuator 3 of the X axis in a block 39, and calculates the rotational angle β1 "(λ²/E1)×Fxz" around the Y axis by the deflection of the Z axis in a block 40, as shown in FIG. 14. Similarly, the calculation part 31 calculates a rotational angle γ2 around the Z axis "(λ²/E1)×Fyx" by the deflection of the X axis due to the operation of the actuator 4 of the Y axis in a block 41, and calculates a rotational angle α1 around the X axis "(λ²/E1)×Fyz" by the deflection of the Z axis in a block 42. The calculation part 31 calculates a rotational angle β2 around the Y axis "(λ²/E1)×Fzx" by the deflection of the X axis due to the operation of the actuator 5 of the Z axis in a block 43, and calculates a rotational angle α2 around the X axis "(λ²/E1)×Fzy" by the deflection of the Y axis in a block 44.

When the coordinates of the orthogonal three axes (X, Y and Z axes) of the triaxial tool unit 1 are taken in the right-handed system, the rotational angle α around the X axis can be obtained by obtaining the difference (α2−α1) obtained by subtracting the rotational angle α1 around the X axis by the Z-axis deflection due to the operation of the actuator 4 of the Y axis from the rotational angle α2 around the X axis by the Y-axis deflection due to the operation of the actuator 5 of the Z axis, for example. Similarly, the rotational angle β around the Y axis can be obtained by obtaining the difference (β1−β2) obtained by subtracting the rotational angle β2 around the Y axis by the X-axis deflection due to the operation of the actuator 5 of the Z axis from the rotational angle β1 around the Y axis by the Z-axis deflection due to the operation of the actuator 3 of the X axis. The rotational angle γ around the Z axis can be obtained by obtaining the difference (γ2−γ1) obtained by subtracting the rotational angle γ1 around the Z axis by the Y-axis deflection due to the operation of the actuator 3 of the X axis from the rotational angle γ2 around the Z axis by the X-axis deflection due to the operation of the actuator 4 of the Y axis.

Thus, in the embodiment 2, the rotational angle calculation part 31 obtains the rotational angle α around the X axis by performing calculation of (α2−α1) in an adder 45 as shown in FIG. 14. Similarly, the calculation part 31 obtains the rotational angle β around the Y axis by performing calculation of (β1−β2) in an adder 46. The calculation part 31 obtains the rotational angle γ around the Z axis by performing calculation of (γ2−γ1) in an adder 47.

As shown in FIG. 14, the positioning error calculation part 32 inputs therein the rotational angles α, β and γ around the three axes calculated in the calculation part 31, and multiplies the rotational angle β around the Y axis by the distance 1z in the Z-axis direction from the center of the above described rotational movement to the cutting edge of the tool 6 to obtain "ex1" in a block 48. The calculation part 32 multiplies the rotational angle γ around the Z axis by the distance 1y in the Y-axis direction from the center of the above described rotational movement to the cutting edge of the tool 6 to obtain "ex2" in a block 49. The calculation part 32 multiplies the rotational angle α around the X axis by the distance 1z in the Z-axis direction from the center of the above described rotational movement to the cutting edge of the tool 6 to obtain "ey1" in a block 50. The calculation part 32 multiplies the rotational angle γ around the Z axis by the distance 1x in the X-axis direction from the center of the above described rotational movement to the cutting edge of the tool 6 to obtain "ey2" in a block 51. The calculation part 32 multiplies the rotational angle α around the X axis by the distance 1y in the Y-axis direction from the center of the above described rotational movement to the cutting edge of the tool 6 to obtain "ez1" in a block 52. The calculation part 32 multiplies the rotational angle β around the Y axis by the distance 1x in the X-axis direction from the center of the above described rotational movement to the cutting edge of the tool 6 to obtain "ez2" in a block 53. The calculation part 32 calculates a positioning error ex in the X axis direction caused to the cutting edge of the tool 6 by calculating (ex1−ex2) in an adder 54 as shown in FIG. 14. The calculation part 32 calculates a positioning error ey in the Y axis direction caused to the cutting edge of the tool 6 by calculating (−ey1−ey2) in an adder 55. The calculation part 32 calculates a positioning error ez in the Z axis direction caused to the cutting edge of the tool 6 by calculating (−ez1−ez2) in an adder 56.

Based on the positioning errors ex, ey and ez in the respective axes directions calculated in the positional error calculation part 32, the reference calculation processing section 25 corrects the references of the respective axes initially calculated in the directions to eliminate the errors, and outputs the references after correction to the positional control loop circuits of the respective axes. By this correction, the cutting edge of the tool can be operated as the references, and therefore, machining can be performed with high precision. In the embodiment 2, the references of the X, Y and Z axes are corrected, but depending on the machining shape, the reference of at least any one of the axes may be simply corrected.

The machining device in the embodiment 2 has the constitution in which a user can input therein the formulae and data which need to be changed in accordance with the machining shape, the machining conditions and the constitution of the triaxial tool unit by the machining condition input section 33, similarly to the embodiment 1. In the embodiment 2, the Young's modulus E of each of the actuators, the sectional secondary moment I of each of the actuators, the distance λ from the end portion at the side of the supporter of each of the actuators to the intersection on the axial line in the operating directions of the respective actuators, the distance 1x in the X-axis direction from the center of the above described rotational movement to the cutting edge of the tool 6, the distance 1y in the Y-axis direction from the center of the above described rotational movement to the cutting edge of the tool 6, and the distance 1z in the Z-axis direction from the center of the above described rotational movement to the cutting edge of the tool 6 need to be changed in accordance with the constitution of the triaxial tool unit, and the user can input the respective data, or the formulae for obtaining the errors ex, ey and ez by the machining condition input section 33.

According to the machining device in the embodiment 2, highly accurate machining is enabled. The result of face-turning the workpiece as shown in the above described FIG. 10 by the machining device in the embodiment 2, and measuring the sectional shape of the workpiece by scanning the sectional shape thereof in the Y direction at the positions of X=0 mm, X=1.5 mm, X=−1.5 mm shown in FIG. 10 is shown in FIG. 16.

Figure 16:
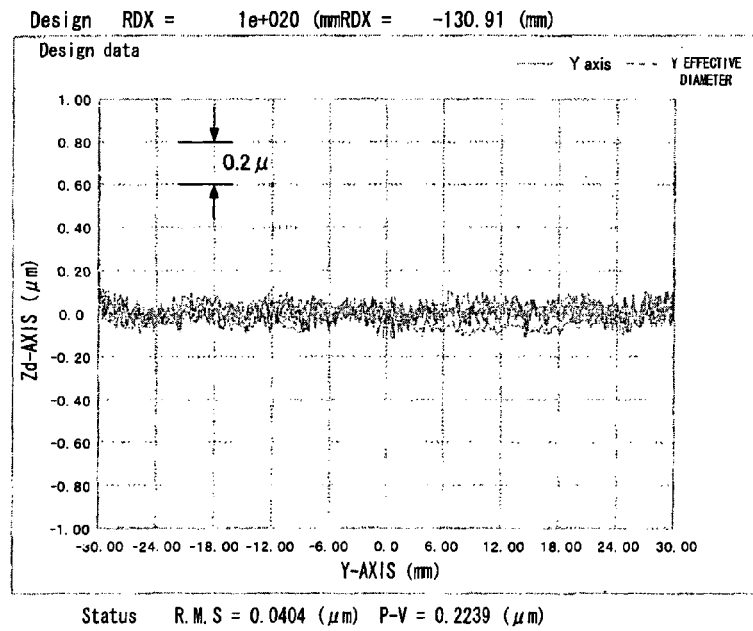
FIG. 16 is a diagram showing a graph expressing a machining result by the machining device in the embodiment 2 of the present invention.
Figure 17:
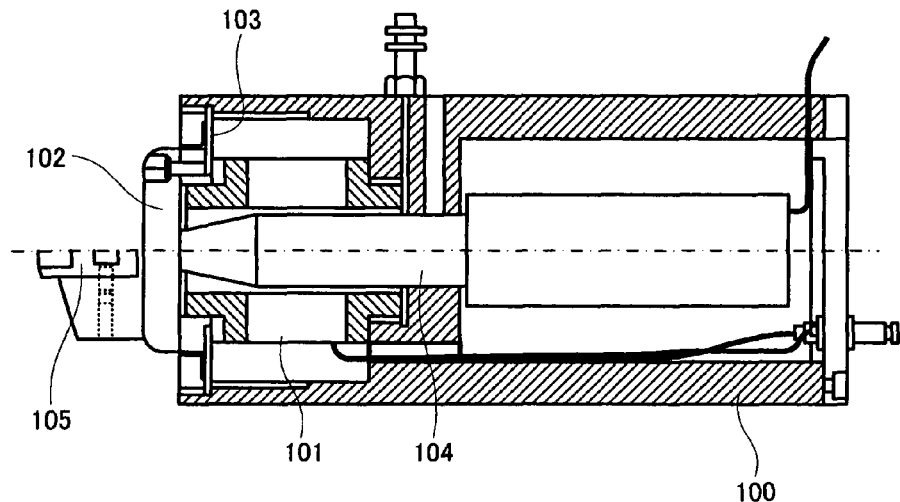
FIG. 17 is an internal structural diagram showing an internal structure of a conventional high-speed positioning mechanism.
Figure 18:
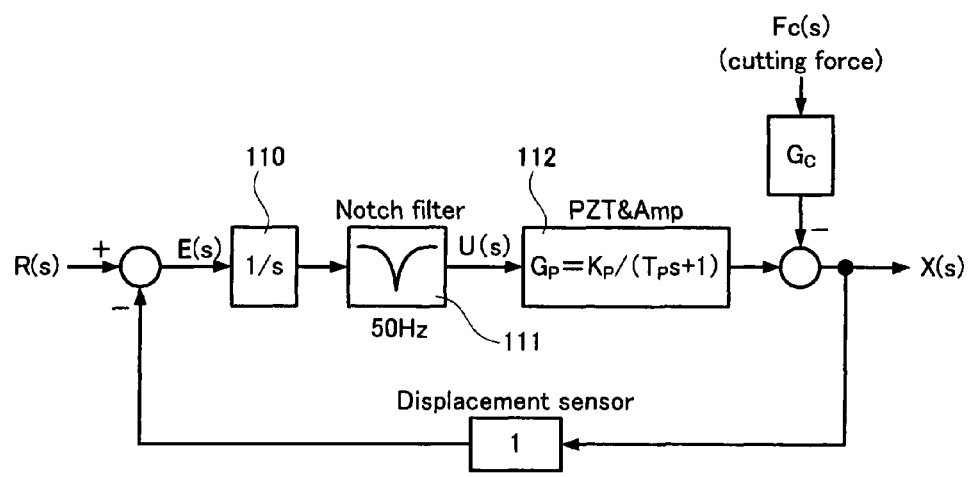
FIG. 18 is a control block diagram of the conventional high-speed positioning mechanism.
Figure 19:
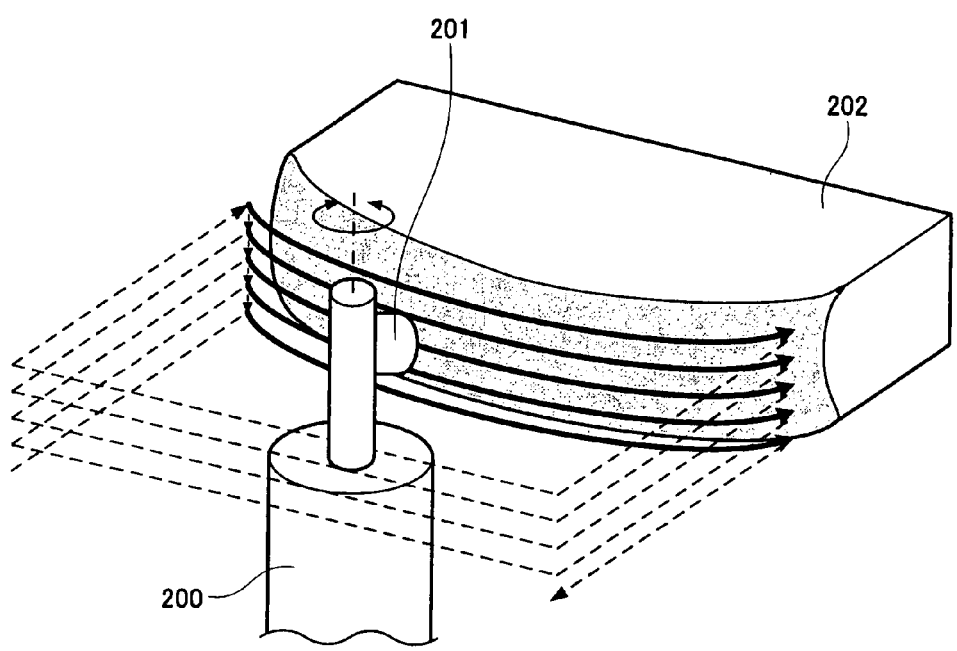
FIG. 19 is an explanatory view for explaining a machining operation by a conventional raster fly cut method.

As shown in FIG. 16, as a result of face-turning the workpiece toward the center of rotation from the outer peripheral side of the workpiece, the shape error due to a phase delay or the like of control of each of the actuators, and the positioning error due to the rotational movement of the cutting edge caused by drive of each of the actuators are favorably corrected, and highly precise shape accuracy can be obtained.

When the workpiece is face-turned as shown in FIG. 10 by using the machining device in the embodiment 2, machining is finished in a short time (machining time of 1 hour) that is ⅛ of the case where the workpiece is face-turned as shown in FIG. 10 by using the conventional cutting method called a raster fly cut method.

As described above, according to the embodiment 2, the reference with the positioning error of the tool cutting edge due to the constitution and the operation of the triaxial tool unit corrected can be calculated in real time, and machining can be performed in an overwhelmingly short time as compared with the conventional tool. High-speed ultra precise machining can be performed by operating the tool three-dimensionally with high accuracy, and precision components such as optical components having microscopic shapes, and precision mechanism components can be machined at a high speed with high accuracy by the same method as the axisymmetric machining method represented by lathing.

In the above described embodiments 1 and 2, the case of using piezoelectric elements for all of the three axes is described, but a piezoelectric element may be used for only one of the three axes, and the elements other than piezoelectric elements may be used for the other two axes, for example. As the elements other than piezoelectric elements, for example, a magnetostrictor, a voice oil motor and the like can be used.

What is claimed is:

1. A machining device comprising:
a triaxial tool unit comprising:
a tool;
a tool holder to which said tool is fixed;
three actuators for operating in three-axis directions orthogonal to one another to displace a position of said tool holder; and
three sensors for generating signals indicating displacement amounts in operating directions of each of said actuators,
wherein said tool holder is located at an intersection of axial lines extending in the operating directions of each of said actuators, and the three sensors are located so that extension lines in respective sensing directions intersect with one another at one point;
a linear stage for moving said triaxial tool unit relatively to a workpiece in the three-axis directions orthogonal to one another;
a rotary stage for moving said triaxial tool unit in circular motion relatively to a workpiece;
a reference calculation processing section for deriving respective references of respective displacement amounts of each of said three actuators according to three-axial coordinates of said linear stage and an angular coordinate of said rotary stage, and for generating command signals to each of said actuators;
a machining condition input section for inputting a machining shape, machining conditions and information corresponding to a constitution of said triaxial tool unit; and
three positional control loop circuits for generating signals for controlling operations of each of said actuators based on deviations between signals from said three sensors and said command signals,
whereby a cutting edge of said tool is brought into contact with a workpiece by adjusting a relative position of said triaxial tool unit to said workpiece by said linear stage, and by driving said actuators by said positional control loop circuits, while the rotary stage causes said triaxial tool unit to perform circular motion relatively to said workpiece.

2. The machining device according to claim 1, wherein said respective sensors are disposed at positions different from positions on the axial lines in the operating directions of said respective actuators.

3. The machining device according to claim 1, wherein the cutting edge of said tool is located on the extension line in the sensing direction of at least one sensor of said three sensors.

4. The machining device according to claim 1, wherein the cutting edge of said tool is located on an intersection on the extension lines in the sensing directions of said three sensors.

5. The machining device according to claim 1, wherein at least one of said three actuators is comprised of a piezoelectric element.

6. The machining device according to claim 1, wherein said reference calculation processing section comprises:
a machining frequency calculation part for calculating operation frequencies of each of said actuators in a machining range corresponding to the present three-axis coordinates of said linear stage;
a phase delay calculation part for calculating phase delays of the signals for controlling the operations of said actuators with respect to said command signals, based on the operation frequencies calculated by said machining frequency calculation part and frequency characteristics of said positional control loop circuits;
a rotational delay angle calculation part for calculating rotational delay angles for each rotational angle of said rotary stage corresponding to an operation delay amount of each of said actuators with respect to each of said command signals, based on said phase delays and a rotational speed of said rotary stage; and
a reference calculation part for calculating said references ahead, by said rotational delay angles, of the angular coordinate of said rotary stage at a time that the cutting edge of said tool enters machining range.

7. The machining device according to claim 1, further comprising:
a rotational angle calculation part for obtaining a force by elastic strains of three axes of said triaxial tool unit based on said references, and calculates rotational angles around the three axes of said tool holder based on the force obtained by the elastic strains; and
a positioning error calculation part for calculating a positioning error of the cutting edge of said tool based on a distance between an intersection on the extension lines in the sensing directions of said three sensors and the cutting edge of said tool, and said rotational angles around the three axes, wherein said reference calculation processing section is further for correcting said references based on said positioning error.

8. A machining method using the machining device according to claim 1, comprising:

the step of inputting a design formula defining a machining target and a shape of a tool by a machining condition input section included in said machining device, wherein said machining device performs machining in sequence while calculating a machining point in real time and obtaining references of actuators included in said machining device during machining.

* * * * *